United States Patent [19]
Lam et al.

[11] Patent Number: 5,958,507
[45] Date of Patent: *Sep. 28, 1999

[54] CARBON DEPOSIT FRICTION LINING MATERIAL

[75] Inventors: Robert C. Lam, Naperville; Yih-Fang Chen, Lisle, both of Ill.

[73] Assignee: Borg-Warner Automotive, Inc., Sterling Heights, Mich.

[ * ] Notice: This patent is subject to a terminal disclaimer.

[21] Appl. No.: 09/085,439

[22] Filed: May 27, 1998

Related U.S. Application Data

[60] Division of application No. 08/893,251, Jul. 16, 1997, Pat. No. 5,856,244, which is a continuation-in-part of application No. 08/704,899, Aug. 30, 1996, which is a continuation of application No. 08/534,978, Sep. 28, 1995, abandoned, which is a continuation-in-part of application No. 08/253,727, Jun. 3, 1994, Pat. No. 5,753,356, which is a continuation-in-part of application No. 08/101,951, Aug. 4, 1993, abandoned.

[51] Int. Cl.$^6$ .................................................. B05D 1/36
[52] U.S. Cl. ........................ 427/203; 427/386; 427/387; 427/389.9
[58] Field of Search ................................ 427/386, 387, 427/389.9, 203

[56] References Cited

U.S. PATENT DOCUMENTS

| | | | |
|---|---|---|---|
| 2,182,208 | 12/1939 | Nason et al. ............................... | 260/19 |
| 2,779,668 | 1/1957 | Daniels et al. ............................ | 51/298 |
| 3,215,648 | 11/1965 | Duffy et al. ............................... | 260/2.1 |
| 3,270,846 | 9/1966 | Arledter et al. .......................... | 192/107 |
| 3,746,669 | 7/1973 | Dummom et al. .......................... | 260/3 |
| 3,899,050 | 8/1975 | Savary et al. ........................... | 188/73.1 |
| 3,911,045 | 10/1975 | Hartmann et al. ....................... | 260/826 |
| 3,927,241 | 12/1975 | Augustin ................................... | 428/408 |
| 3,980,729 | 9/1976 | Yokokawa et al. ...................... | 260/826 |
| 4,020,226 | 4/1977 | Andrianov et al. ...................... | 428/290 |
| 4,051,097 | 9/1977 | Aldrich ..................................... | 260/38 |
| 4,256,801 | 3/1981 | Chuluda ................................... | 428/280 |
| 4,259,397 | 3/1981 | Saito et al. ............................... | 428/288 |
| 4,320,823 | 3/1982 | Covaleski ................................. | 192/107 |
| 4,324,706 | 4/1982 | Tabe et al. ............................... | 523/435 |
| 4,352,750 | 10/1982 | Eschen ..................................... | 523/156 |
| 4,373,038 | 2/1983 | Moraw et al. ............................ | 523/156 |
| 4,374,211 | 2/1983 | Gallagher et al. ....................... | 523/156 |
| 4,451,590 | 5/1984 | Fujimaki et al. ......................... | 523/155 |
| 4,456,650 | 6/1984 | Melotik et al. ........................... | 428/290 |
| 4,457,967 | 7/1984 | Chareire et al. ......................... | 428/212 |
| 4,514,541 | 4/1985 | Frances ................................... | 524/514 |
| 4,558,089 | 12/1985 | Koyama et al. ......................... | 428/367 |
| 4,563,386 | 1/1986 | Schwartz ................................. | 428/283 |
| 4,593,802 | 6/1986 | Danko, Jr. .............................. | 192/107 M |
| 4,628,001 | 12/1986 | Sasaki et al. ............................ | 428/367 |
| 4,646,900 | 3/1987 | Crawford et al. ....................... | 192/107 R |
| 4,656,203 | 4/1987 | Parker ..................................... | 523/155 |
| 4,657,951 | 4/1987 | Takarada et al. ........................ | 523/153 |
| 4,663,230 | 5/1987 | Tennent ................................... | 428/367 |
| 4,663,368 | 5/1987 | Harding et al. .......................... | 523/155 |
| 4,672,082 | 6/1987 | Nakagawa et al. ..................... | 523/153 |
| 4,694,937 | 9/1987 | Jonas ...................................... | 188/73.1 |
| 4,700,823 | 10/1987 | Winckler ................................. | 192/107 M |
| 4,743,634 | 5/1988 | Royer ...................................... | 523/150 |
| 4,792,361 | 12/1988 | Double et al. ........................... | 106/97 |
| 4,918,116 | 4/1990 | Gardziella et al. ...................... | 523/149 |
| 4,983,457 | 1/1991 | Hino et al. ............................... | 428/367 |
| 5,004,497 | 4/1991 | Shibata et al. ........................... | 75/229 |
| 5,033,596 | 7/1991 | Genise ..................................... | 192/53 |
| 5,080,969 | 1/1992 | Tokumura ................................ | 428/327 |
| 5,083,650 | 1/1992 | Seiz et al. ........................... | 197/107 M |
| 5,093,388 | 3/1992 | Siemon, Jr. et al. ................... | 523/149 |
| 5,290,627 | 3/1994 | Ikuta ....................................... | 428/251 |
| 5,585,166 | 12/1996 | Kearsey . | |

FOREIGN PATENT DOCUMENTS

| | | |
|---|---|---|
| 0180381A3 | 7/1986 | European Pat. Off. . |
| 0202145 | 11/1986 | European Pat. Off. . |
| 0637698 | 2/1995 | European Pat. Off. . |
| 0669482A3 | 2/1995 | European Pat. Off. . |
| 0695887 | 2/1996 | European Pat. Off. . |
| 0766019A1 | 4/1997 | European Pat. Off. . |
| 2828918 | 1/1979 | Germany . |
| 4211010 | 10/1992 | Germany . |
| 58180573 | 10/1981 | Japan . |
| 59-103040 | 6/1984 | Japan . |
| 3150266 | 6/1991 | Japan . |
| 6299434 | 9/1994 | Japan . |
| 1054890 | 1/1967 | United Kingdom . |
| 2224285 | 2/1990 | United Kingdom . |
| 2241246 | 8/1991 | United Kingdom . |
| WO 95/26473 | 10/1995 | WIPO . |

OTHER PUBLICATIONS

A. Knop, W. Scheib, Chemistry and Application of Phenolic Resins, Springer–Verlag, Berlin Heidelberg, NY (1979), pp. 230–232.

Artificial Graphite, Material Safety Data Sheet, prepared Jun. 7, 1991, U.S. Dept. of Labor.

AKZO, Material Safety Data Sheet, prepared Jul. 11, 1994 pp. 1–4.

Jack J. Pigliacamp, Organic Fibers, pp. 54 & 55, E.I. Du Pont de Nemours & Company, Inc. (No Date).

Freeness of Pulp, T 227 om–85, 1985 TAPPI.

European Search Report–dated Nov. 22, 1994 for EP 94 30 5407.

European Search Report–dated May 4, 1994 for EP 93 11 8967.

European Search Report–dated Dec. 19, 1996 for EP 96 30 6350.8.

*Primary Examiner*—Christopher Raimund
*Attorney, Agent, or Firm*—Emch, Schaffer, Schaub & Porcello Co. LPA; Greg Dziegielewski

[57] ABSTRACT

The present invention relates to a friction material comprising a fibrous base material primary layer of less fibrillated aramid fibers, synthetic graphite and at least one filler material, and a secondary layer of a mixture of carbon particles and at least one retention aid coated on at least one surface of the primary layer. In certain embodiments, the fibrous base material is impregnated with a phenolic or phenolic-based resin material, including, for example, a mixture of a phenolic resin and a silicone resin to form a friction material having high heat resistance and high friction durability characteristics.

19 Claims, 24 Drawing Sheets

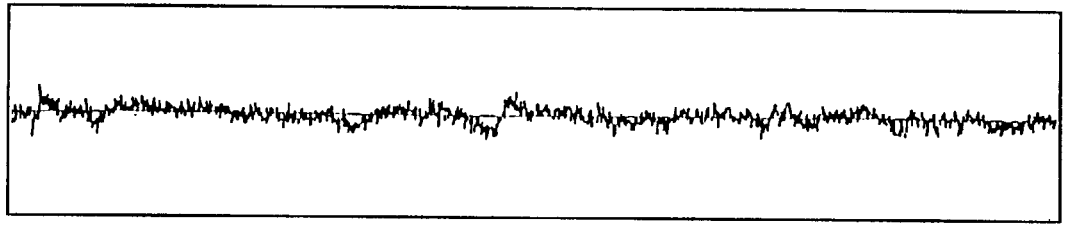
FIG. 25 — NEW SEPARATOR PLATE — Ra 6.0 μ in
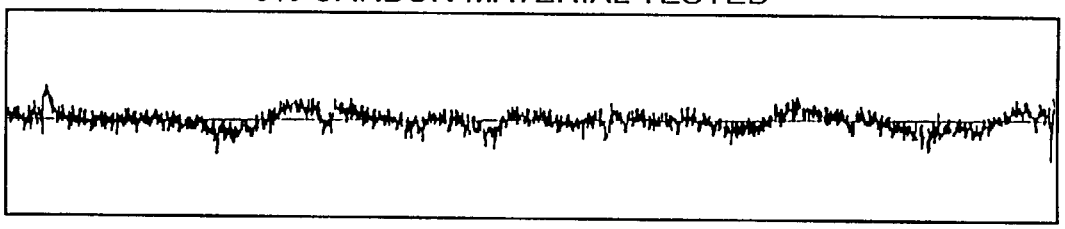
FIG. 26 — 0% CARBON MATERIAL TESTED — Ra 7.6 μ in
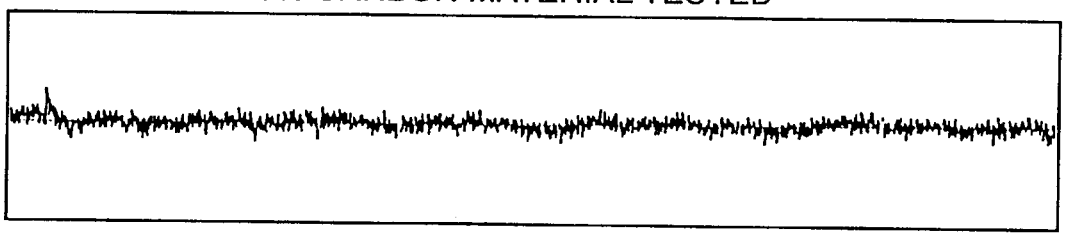
FIG. 27 — 5% CARBON MATERIAL TESTED — Ra 6.0 μ in

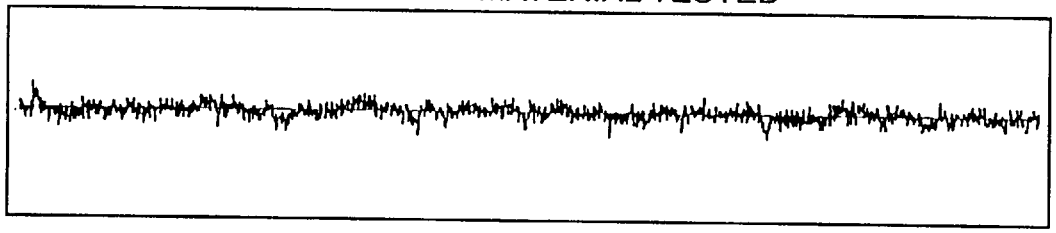
FIG.28  10% CARBON MATERIAL TESTED  Ra 5.6 μ in
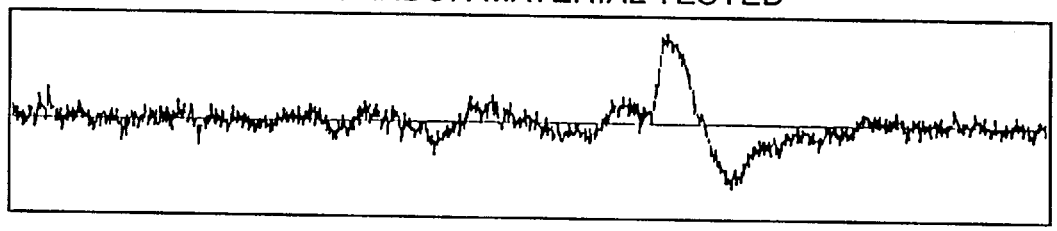
FIG.29  15% CARBON MATERIAL TESTED  Ra 11.5μ in
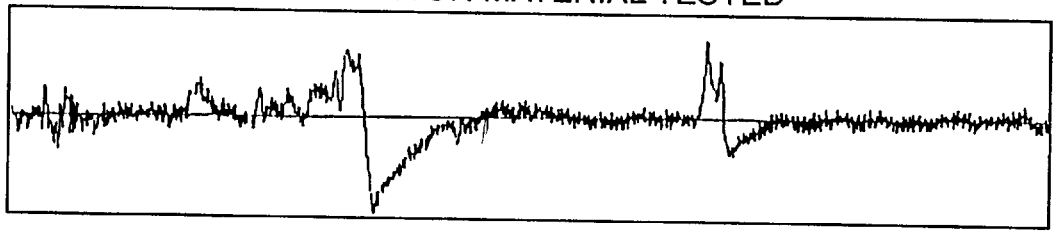
FIG.30  20% CARBON MATERIAL TESTED  Ra 11.7μ in

CARBON DEPOSIT FRICTION LINING MATERIAL

This application is a divisional of application Ser. No. 08/893,251, filed on Jul. 16, 1997, now U.S. Pat. No. 5,856,244, which is a continuation-in-part of Ser. No. 08/704,899 filed Aug. 30, 1996, still pending, which is a continuation of Ser. No. 08/534,978 filed Sep. 28, 1995, , abandoned, which is a continuation-in-part of Ser. No. 08/253,727 filed Jun. 3, 1994, now U.S. Pat. No. 5,753,356, which is a continuation-in-part of Ser. No. 08/101,951 filed Aug. 4, 1993, abandoned, all of which are expressly incorporated herein by reference.

TECHNICAL FIELD

The present invention relates to a friction material comprising a fibrous base material having carbon particles adhered to the surface of the fibrous base material by a retention aid material. The fibrous base material comprises a primary layer having less fibrillated aramid fibers, manufactured or synthetic graphite and at least one filler material, such as diatomaceous earth and a secondary layer having carbon particles. The invention further relates to a composite friction material comprising the above described fibrous base material impregnated with a phenolic resin or a modified phenolic resin blend. In certain embodiments, at least one silicone resin is blended with at least one phenolic resin for use in impregnating the fibrous base material.

The friction material of the present invention has better "break-in" behavior and more stable coefficients of friction in the initial stages than conventional friction materials. Also, the resulting friction material is especially useful in high energy applications.

BACKGROUND ART

New and advanced transmission systems and braking systems are being developed by the automotive industry. These new systems often involve high energy requirements. Therefore, the friction materials technology must be also developed to meet the increasing energy requirements of these advanced systems.

The friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced transmission and braking systems. Not only must the friction material remain stable at high temperatures, it must also be able to rapidly dissipate the high heat that is being generated during operating conditions.

The high speeds generated during engagement and disengagement of the new transmission and braking systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. In particular, the friction material must not shudder during the initial cycles or "break-in" period of operation.

Previously, asbestos fibers were included in the friction material for temperature stability. For example, the Arledter et al. U.S. Pat. No. 3,270,846 patent describes phenolic and phenolic-modified resins used with asbestos. Now, however, due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

While phenolic resins have found use in friction materials for wet clutch applications, the phenolic resins have various limitations. The phenolic resin friction materials do not have the high heat resistance necessary for use with the new high energy transmission systems. In particular, the phenolic resins carbonize at a temperature of about 450° to 500° C. which is too low to be useful in high energy applications. In addition, phenolic resins are rigid materials and when the phenolic resins are used in a friction material, uneven lining wear and separator plate "hot spots" result.

Attempts to overcome the limitations and drawbacks of phenolic resin friction materials include the replacement of phenolic resins with other thermosetting resins. One attempt to produce friction materials involves the modification of a phenolic resin with various synthetic resins. One example, described in Takarada et al. U.S. Pat. No. 4,657,951, is a phenolic resin modified with an organopolysiloxane which is compression molded to form a friction material. The phenolic resin and organopolysiloxane are reacted together to effect a condensation reaction which is then distilled, solidified by cooling, and pulverized to obtain a powdered phenolic-modified resin. The powdered phenolic-modified resin was used in forming a compression molded friction material.

As far as is known, there is no disclosure of a friction material for use in transmission systems which includes a silicone material blended with a phenolic material and used to impregnate a friction paper.

While the Hartmann et al. U.S. Pat. No. 3,911,045 reference discusses a silicone material blended with phenolic resins for use as a compression molding composition, there is no disclosure or suggestion that a silicone material could successfully be blended with a resin material and used to impregnate a friction lining material. On the contrary, previous attempts to use silicone resins in friction materials have been unacceptable. A friction lining that is impregnated or saturated with a silicone resin has, in the past, demonstrated poor shear strength and delamination resistance. Further, friction materials saturated with a silicone resin are usually too elastic and therefore tests with undesirable friction and wear characteristics resulting. It is not surprising that molded friction lining compositions formed entirely of a phenol-formaldehyde resin-polysiloxane resin have not been used even though they are known, since such molded compositions do not have the necessary constant coefficient of friction characteristics and such friction materials fail under high energy and high heat conditions.

The present invention is an improvement over the Seitz, U.S. Pat. No. 5,083,650 reference which involves a multi-step impregnating and curing process; i.e., a paper is impregnated with a coating composition, carbon particles are placed on the paper, the coating composition in the paper is partially cured, a second coating composition is applied to the partially cured paper, and finally both coating compositions are cured.

In order for friction materials to be useful in "wet" applications, the friction material must have a wide variety of acceptable characteristics. The friction material must be resilient or elastic yet resistant to compression set, abrasion and stress; have high heat resistance and be able to dissipate heat quickly; and, have long lasting, stable and consistent frictional performance. If any of these characteristics are not met, optimum performance of the friction material is not met.

Thus, it is also important that the impregnating resin be used with a suitable friction lining or fibrous base material to form a high energy application friction material. The friction material must have good shear strength both when saturated with the wet resin during impregnation and when saturated with brake fluid or transmission oil during use.

It is also important, under certain applications, that the friction material have high porosity such that there is a high fluid permeation capacity during use. Thus, it is important that the friction material not only be porous, it must also be compressible. The fluids permeated into the friction material must be capable of being squeezed or released from the friction material quickly under the pressures applied during operation of the brake or transmission, yet the lining material must not collapse. It is also important that the friction material have high thermal conductivity to also help rapidly dissipate the heat generated during operation of the brake or transmission.

Accordingly, it is an object of the present invention to provide an improved friction material with reliable and improved properties compared to those of the prior art.

A further object of this invention is to provide friction materials with good anti-shudder performance, high speed and energy durability, high porosity and strength.

As a result of extensive research in view of the need for a better friction: material, a friction material with improved characteristics has been developed by the inventors. The present friction material is especially useful in applications where the friction material is subjected to harsh "break-in" conditions during use.

DISCLOSURE OF THE INVENTION

In order to achieve the requirements discussed above, many materials were evaluated for friction and heat resistant characteristics under conditions similar to those encountered during operation. Both commercially available brake linings and transmission materials were investigated and proved not to be suitable for use in high energy applications.

The present invention is especially useful in brakes and in clutch applications. One aspect of the present invention relates to friction materials which comprise a primary layer of a fibrous base material comprising less fibrillated aramid fibers, synthetic graphite, at least one filler material and optionally other ingredients, and a secondary layer comprising an optimum amount of carbon particles and at least one retention aid. The carbon particles are deposited on the primary layer during the process for making the fibrous base material.

The carbon particles are adhered to the surface of the fibrous base material with at least one retention aid. In preferred embodiments, the carbon deposit fibrous base material of the present invention has substantially no loose carbon particles on the surface. The carbon deposit fibrous base material, when impregnated with a resin system, provides a friction material having high heat resistance and high friction durability.

In a preferred method for making the carbon deposit fibrous base material, the carbon particles and the retention aid are combined together and then deposited on the fibrous base material as a secondary layer. In preferred embodiments, the carbon particles/retention aid secondary layer is deposited at a thickness or depth of about 10 to about 50 microns. In preferred embodiments, the retention aid is present in amounts ranging from about 2 to about 25%, by weight, of the carbon particles. In certain preferred embodiments, the retention aid comprises a latex-type binder including, for example, acrylic nitride latex, neoprene latex and the like. In other preferred embodiments, the retention aid comprises at least one resinous material, including for example, phenolic resins, epoxy resins and the like. In still other preferred embodiments, the retention aid comprises at least one sizing agent, including for example, epoxides, silanes and the like.

In preferred embodiments, the secondary layer comprises about 0.2 to about 20%, more preferably about 5 to about 15%, and most preferably about 3 to about 5%, by weight, of the carbon particles, based on the weight of the fibrous base material. It has been found that carbon particles having diameters ranging from about 0.5 to about 120 and preferably from about 6 to about 50 microns.

The secondary layer comprising the carbon particles and retention aid is present at about 0.2 to about 20%, more preferably about 5 to about 15%, and most preferably about 3 to about 5%, by weight, based on the weight of the fibrous base material.

The area of coverage of the primary layer by the carbon particles in the secondary layer is preferably in the range of about 3 to about 80% of the surface area of the primary layer. The primary layer of the fibrous base is preferably porous and has an average pore diameter of about 2 to about 15 microns, and in certain embodiments from about 2 to about 12 microns. It has been found that the fibrous base material has, in certain embodiments, readily available air voids of at least about 50%

It has been found that an especially preferred primary layer of the fibrous base material comprises less fibrillated aramid fibers having a freeness greater than about 300–700 on the Canadian Standard Freeness index, synthetic graphite, and optionally filler material. In certain embodiments, the less fibrillated aramid fibers have a freeness of about 580 to about 640 on the Canadian Standard Freeness index. The length of the less fibrillated aramid fibers preferably ranges from about 3 to about 6 mm in length. A preferred synthetic graphite is made by graphitization of a graphite material at temperatures of about 2800–300° C. Preferably, the graphite has a diameter ranging from about 20 to about 50 microns. In embodiments containing a filler material, it has been found that diatomaceous earth is especially useful.

In especially preferred embodiments, the primary layer of the fibrous base material comprises about 10 to about 50%, most preferably about 20 to about 30%, by weight, less fibrillated aramid fibers; about 10 to about 35%, most preferably about 15 to about 35%, by weight, synthetic graphite; and about 20 to about 45%, most preferably about 20 to about 30%, by weight, filler material. In especially preferred embodiments, the secondary layer comprises about 0.2 to about 20%, most preferably about 3 to about 5%, by weight, carbon particles and retention aid.

It has also been found, in certain embodiments, that the primary layer of the fibrous base material can include about 0 to about 40%, most preferably about 20 to about 40%, by weight, cotton fibers.

The fibrous base material can be impregnated using different resin systems to form the friction material. In certain embodiments, it is useful to impregnate the fibrous based material with a phenolic resin or a modified phenolic-based resin. In preferred embodiments, the friction material comprises about 25 to about 60% resin, by weight, based on the weight of the friction material. It has been found that one useful modified phenolic resin comprises an epoxy phenolic resin, where the epoxy resin present in the epoxy phenolic resin ranges from about 5 to about 25%, preferably about 10 to about 15%, by weight, based on the weight of the epoxy phenolic resin. It has also been discovered that, in certain embodiments, when a silicone resin is blended or mixed with a phenolic resin in compatible solvents and that silicone-phenolic resin blend is used to impregnate a fibrous base material of the present invention, a high energy friction material is formed. Such high energy friction material has high friction stability and high heat resistance.

In certain embodiments, the amount of silicone resin in the phenolic-silicone mixture ranges from about 5 to about 80%, preferably about 15 to about 25% or about 20 to about 25%, by weight, based on the weight of the mixture. The mixture of phenolic and silicone resins is preferably made by having the phenolic resin present in a first solvent material and the silicon resin present in a second solvent material which is compatible with the first solvent material.

Another aspect of the present invention relates to a method for making the carbon deposit friction material. The less fibrillated aramid fibers, synthetic graphite and optionally filler material and/or cotton fibers are mixed together and dispensed, as the primary layer, preferably from a primary header box to form the fibrous base material primary layer. The carbon particles are mixed together with the retention aid and dispensed as the secondary layer, preferably from a secondary header box onto at least one surface of the primary layer. The secondary layer coats the primary layer to a preferred depth and amount of surface area coverage. The carbon deposit fibrous base material is impregnated with at least one phenolic resin or modified phenolic resin. The impregnated carbon deposit fibrous base material is cured at a desired temperature for a desired period of time.

The carbon deposit friction material has higher heat resistance and higher friction durability than other friction materials. The friction material of the present invention prevents uneven lining wear and therefore the formation of separator plate "hot spots" from developing during the useful life of the friction material. When there is little uneven wear on the friction material, there is more likelihood to maintain "steady state" of the clutch or brake components and therefore, more consistent performance of the clutch and brake. Further, the friction material of the present invention shows good shear strength such that the friction material resists delamination during use.

BRIEF DESCRIPTION OF DRAWINGS

FIG. 25 is a new separator plate profile having no carbon as a secondary layer.

FIG. 26 is a separator plate surface profile for Example S having no carbon as a secondary layer.

FIG. 27 is a separator plate surface profile for Example T having a secondary layer comprising about 5% carbon.

FIG. 28 is a separator plate surface profile for Example U having a secondary layer comprising about 10% carbon material.

FIG. 29 is a separator plate surface profile for Example V having a secondary layer comprising about 15% carbon material.

FIG. 30 is a separator plate surface profile for Example W having a secondary layer comprising about 20% carbon material.

BEST MODE OF CARRYING OUT THE INVENTION

Figure 1A:
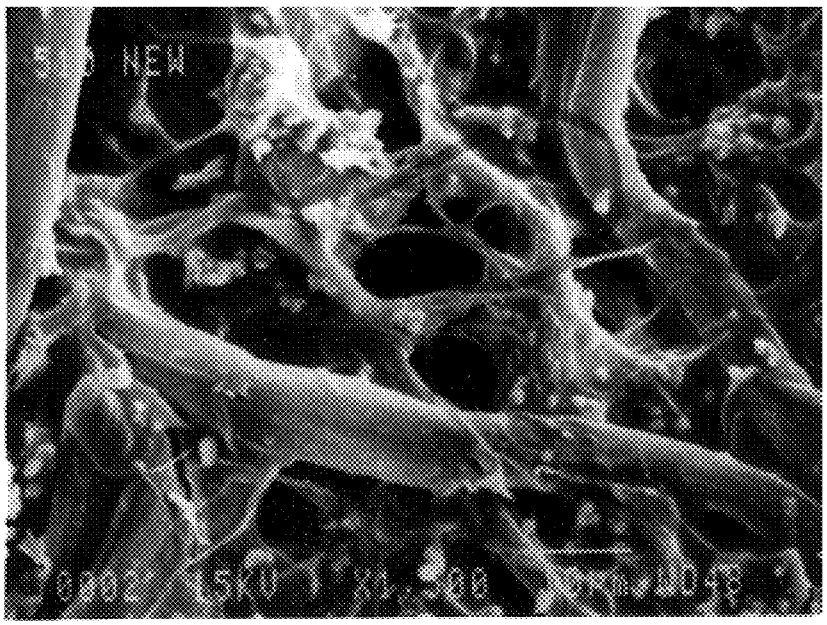
FIG. 1A is a scanning electron microphotograph of a fibrous base material impregnated with a silicone-phenolic blend (Example C).

Various resins useful in the present invention include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

It further contemplated that other ingredients and processing aids known to be useful in both preparing resin blends and in preparing impregnating fibrous-based materials can be included in the friction materials.

For the embodiments where a phenolic resin and silicone resin are used, no new compound is formed when the silicone resin and phenolic resin are blended together. Table 1 shows the prominent FT-IR peaks in wave numbers for a cured silicone resin, a cured phenolic resin, and about 50/50 blend of silicone resin and phenolic resin which has been cured. As can be seen, no new peaks occur in the 50/50 silicone-phenolic blend, and the peaks that are present reflect the presence of both the silicone resin and the phenolic resin. Thus, it is shown that the resins cure separately and that no new compound is formed.

TABLE 1

PROMINENT FT-IR PEAKS IN WAVENUMBERS

| SILICONE RESIN | PHENOLIC RESIN | 50/50 BLEND |
| --- | --- | --- |
| — | 3364 | 3366 |
| 2966 | — | 2964 |
| — | 1510 | 1510 |
| — | 1479 | 1481 |
| 1412 | — | 1410 |
| 1271 | — | 1261 |
| 798 | — | 800 |
| 767 | — | 769 |

Both the silicone resin and the phenolic resin are present in solvents which are compatible to each other. These resins are mixed together (in preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

Therefore, according to one aspect of the present invention, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. According to the present invention, the presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

Various methods for impregnating materials can be practiced with the present invention. The fibrous base material is impregnated with the phenolic or modified phenolic resin, preferably so that the impregnating resin material comprises about 45 to about 65 parts, by weight, per 100 parts, by weight, of the friction material. After the fibrous base material has been impregnated with the resin, the impregnated fibrous base material is heated to a desired temperature for a predetermined length of time to form the friction material. The heating cures the phenolic resin at a temperature of about 300° F. When other resins are present, such as a silicone resin, the heating cures the silicone resin at a temperature of about 400° F. Thereafter, the impregnated and cured friction material is adhered to the desired substrate by suitable means.

Another aspect of the present invention relates to a fibrous base material comprising less fibrillated aramid fibers, synthetic graphite and at least one filler material, which are combined to form a paper-like fibrous base material. It is to be understood that various methods of forming fibrous base materials are contemplated as being useful in preparing the fibrous base material of the present invention. It has been found by the inventors herein that the use of less fibrillated aramid fibers and synthetic graphite in a fibrous base material improves the friction material's ability to withstand high temperatures.

While various friction lining materials disclose the use of aramid fibers, it has not been known until the present invention to provide a friction material comprising less fibrillated aramid fibers which generally have few fibrils attached to a core fiber. The use of the less fibrillated aramid fibers provides a friction material having a more porous structure; i.e., there are more and larger pores than if a typical fibrillated aramid fiber is used. The porous structure is generally defined by the pore size and liquid permeability. In a preferred embodiment, the fibrous base material defines pores ranging in mean average size from about 2.0 to about 15 microns in diameter. The length of the less fibrillated fiber ranges from about 0.5 to about 6 mm and has a Canadian Standard Freeness (CSF) of greater than about 450 and in certain embodiments, about 500 to about 550 and in other certain embodiments, about 580–640 and most preferably about 620–640. In contrast, more fibrillated fibers, such as aramid pulp, have a freeness of about 285–290.

The "Canadian Standard Freeness" (T227 om-85) means that the degree of fibrillation of fibers can be described as the measurement of freeness of the fibers. The CSF test is an empirical procedure which gives an arbitrary measure of the rate at which suspension of three grams of fibers in one liter of water may be drained. Therefore, the less fibrillated aramid fibers have higher freeness or higher rate of drainage of fluid from the friction material than other aramid fibers or pulp. It has now been surprisingly found that friction materials comprising the aramid fibers having a CSF ranging from about 530–650, preferably about 580–640, and most preferably about 620–640, provide superior friction performance and have better material properties than friction materials containing conventionally more fibrillated aramid fibers. It has surprisingly been found that the longer fiber length, together with the high Canadian freeness, provide a friction material with high strength, high porosity and good wear resistance. As shown in the examples below, high energy tests conducted with materials containing, for example, the less fibrillated aramid fibers (CSF about 580–640 and most preferably about 620–640), have good long-term durability and stable coefficients of friction.

The more porous the structure of the friction material, the more efficient is the heat dissipation. The oil flow in and out of the friction material during engagement of the friction material during use occurs more rapidly when the friction material is porous.

It has further been discovered that the less fibrillated fibers, synthetic graphite and filler improve the pore structure of the fibrous base material so that there are more porous openings throughout the fibrous base material. The increased porosity also increases the elasticity of the friction material. A lower degree of fibrillation of the less fibrillated aramid fibers results in a friction material having a more porous structure.

It has not been known until the present invention to include synthetic graphite in a fibrous base material comprising less fibrillated aramid fibers. The use of synthetic graphite in the fibrous base material provides a more three dimensional structure to the fibrous base material than other types of graphite material. The synthetic graphite is made by graphitization of a raw stock material such as petroleum coke and a coal tar pitch binder. The raw materials are mixed and heated to temperatures of about 2,800 to about 3,000° C. in special graphitizing furnaces which convert the baked carbon body into a polycrystaline graphite article. The synthetic graphite (which has high thermal conductivity) provides the friction material with the ability to dissipate heat more rapidly than other types of graphite. In certain embodiments, it is preferred that the size and geometry of the synthetic graphite be in the about 20 to about 50 micron size range. In these certain embodiments, it has been discovered that if the graphite particle size is too large or too small, there is not the optimum three-dimensional structure and consequently the heat resistance is not as optimum.

Various fillers are also used in the fibrous base material of the present invention. In particular, silica fillers, such as diatomaceous earth, are useful. However, it is contemplated that other types of fillers are suitable for use in the present invention and that the choice filler depends on the particular requirements of the friction material. Other ingredients can be added to the fibrous base material of the present invention, including for example, cotton fibers which can be added to give the fibrous material higher coefficients of friction. In certain embodiments, about 0 to about 20%, and in certain embodiments about 5 to about 15%, other filler such as aramid pulp and/or aramid floc can also be added to the fibrous base material.

One example of a formulation for a fibrous base material comprises about 10 to about 50%, by weight, of a less fibrillated aramid fiber; about 10 to about 35%, by weight, of a synthetic graphite; and, about 20 to about 45%, by weight, of a filler material. In certain embodiments, one particular formulation has found to be useful comprises about 45 to about 50%, by weight, less fibrillated aramid fibers: about 15 to about 25%, by weight, synthetic graphite; and, about 20 to about 30%, by weight, filler. Another useful formulation comprises about 20 to about 30% less fibrillated aramid fibers, about 15 to about 25% synthetic graphite, about 20 to about 30% filler material, and optionally about 0 to about 40% cotton fibers. In further embodiments, the cotton fibers can be present at about 20 to about 40%, by weight, or about 25 to about 35%, by weight.

The following examples provide further evidence that the fibrous base material and friction material of the present invention are an improvement over the conventional friction material. Various preferred embodiments of the invention are described in the following examples, which however, are not intended to limit the scope of the invention.

Examples A and B both are a fibrous base material comprising about, in percent, in weight, about 45% less fibrillated aramid fibers, about 23% synthetic graphite, about 27% diatomaceous earth filler, and about 5% optional filler comprising aramid pulp. Example A is impregnated with a phenolic material and Example B is impregnated with a silicone-phenolic resin blend comprising about 20% silicone and about 80% phenolic resins.

Example C is a fibrous base material comprising in percent, by weight, about 35% less fibrillated aramid fibers, about 25% synthetic graphite, about 25% diatomaceous earth filler material, and other optional fillers of about 5% aramid pulp and about 10% aramid floc, and impregnated with a silicone-phenolic resin blend.

Example D is a fibrous base material comprising in percent, by weight, about 25% less fibrillated aramid fibers, about 20% synthetic graphite, about 25% diatomaceous earth, and about 30% cotton fibers and impregnated with a first epoxy-phenolic resin blend comprising about 10% epoxy and about 90% phenolic resins.

Example E is a fibrous base material comprising about 25% less fibrillated aramid fibers, about 20% synthetic graphite, about 25% diatomaceous earth, and about 30% cotton fibers and impregnated with a second epoxy-phenolic resin.

Example F is a fibrous base material comprising, in percent, by weight, about 25% less fibrillated aramid fibers, about 20% synthetic graphite, about 25% diatomaceous earth, and about 30% cotton fibers and impregnated with the second epoxy-phenolic resin blend

EXAMPLE 1

FIG. 1A, shows a scanning electron microscopic (SEM) photograph of Example C which indicates that a thin film of silicone resin forms between the fibers during impregnation. Example C has an increased pore size over friction materials impregnated with either a silicone resin or phenolic resin alone. Since the silicone resins and phenolic resins cure at different temperatures, the phenolic resin cures first while the silicone resin cures later. A thin film of silicone resins formed between the fibers during cure. This thin film of silicone resin between the fibers is thought to contribute to the high friction stability of the friction material. The film of silicone resin slows down the deterioration of the friction material and allows the friction material to have a high heat resistance at high temperatures.

Figure 1B:
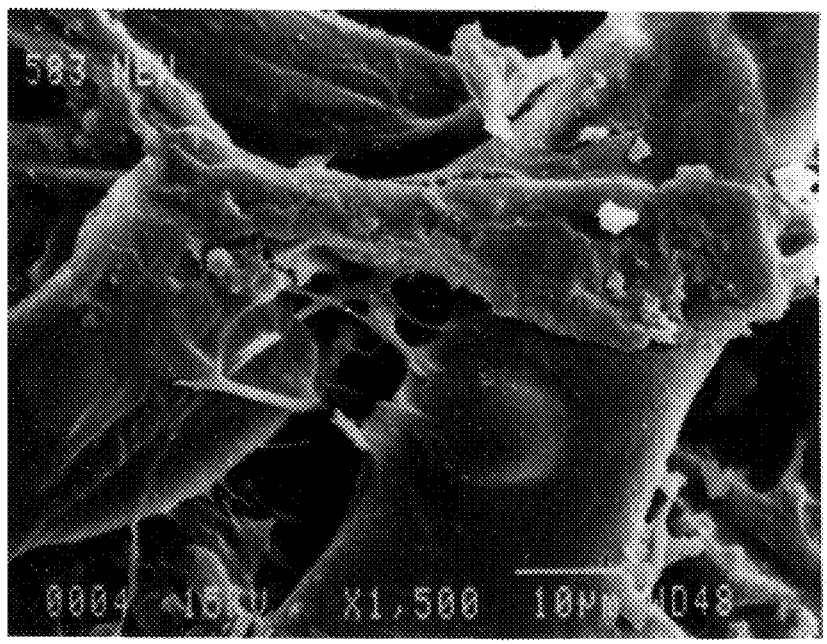
FIG. 1B is a scanning electron microphotograph of a conventional fibrous material impregnated with a phenolic resin (Conventional-1).

The SEM photographs shown in FIG. 1A show a much larger pore structure than for the phenolic resin-impregnated friction material, a conventional material (Conventional-1) which contains no less fibrillated aramid fibers and no synthetic graphite, shown in FIG. 1B.

As seen in FIG. 1A, the blend of silicone and phenolic resins results in a fiber-resin interaction which creates a flexible and open fiber network. Up to about a 50% larger pore size has been seen with the phenolic-silicone blend impregnated friction material than over phenolic resin impregnated friction material alone. In certain embodiments, the mean pore size ranges from about 2.5 to about 4 microns in diameter and the friction material had readily available air voids of at least about 50% and in certain embodiments at least about 60% or higher.

EXAMPLE 2

The capillary flow and permeability tests are shown in Table 2 below for Examples B, D, E and a comparative material having natural graphite but no synthetic graphite. The higher mean flow pore diameter and Darcy's permeability indicate that the friction material is more likely to run cooler or with less heat generated in a transmission due to better automatic transmission fluid flow of material throughout the porous structure of the friction material. During operation of a transmission system, oil deposits on the surface of a friction material tend to develop over time due to a breakdown of the automatic transmission fluid, especially at high temperatures. The oil deposits on the fibers decrease the pore openings. Therefore, when a friction material initially starts with larger pores, there are more open pores remaining during the useful life of the friction material. In addition, the silicone resin, due its elastic characteristics, allows the fibers in the friction lining to have a more open structure.

TABLE 2

CAPILLARY FLOW AND PERMEABILITY

| | Darcy's Permeability | Mean Flow Pore Diameter | Sample Thickness Inches, | cm |
|---|---|---|---|---|
| Ex. B | $2.0 \times 10$ | 2.77 microns | 0.021 | 0.05334 |
| Ex. D | $1.0 \times 10^{-2}$ | 2.85 microns | 0.016 | 0.04191 |
| Ex. E | $1.0 \times 10^{-2}$ | 2.34 microns | 0.017 | 0.04318 |
| Compar. | $5.1 \times 10^{-3}$ | 1.77 microns | 0.019 | 0.04826 |

Glaze analysis of the scanning electron microscopic photographs shows that the silicone-phenolic resin blend has a slight fiber compression on the surface while the phenolic resin alone has a pronounced fiber compression on the surface for unused plates. Further, as seen in Table 3, in used plates, there are open pores remaining in a silicone-phenolic resin blend while there are very few pores open in the phenolic resin material alone.

TABLE 3

GLAZE ANALYSIS
SCANNING ELECTRON MICROSCOPY

| Example C | Conventional Material - 1 |
|---|---|
| UNUSED PLATES | |
| * Slight fiber compression on surface | * Pronounced fiber compression on surface |
| * No fiber compression internally | * No fiber compression internally |
| * Resin forms a film between fibers | * Resin only coats fibers |
| USED PLATES | |
| * Surface Glazes | * Surface glazes |
| * Open pores | * Very few open pores |

EXAMPLE 4

Previously, unreacted silicone resins have not been acceptable for use in a friction material since the silicone resin has low strength. However, it has now been found that the shear strength of the silicone-phenolic resin blends is remarkably higher than for phenolic resins alone. The tensile shear test was run on the Instron tensile tester. A modified lap shear configuration was used with a 2 square inch area of friction material bonded on both side to steel plates. This assembly was then pulled until the paper sheared. The values in Table 4 below indicate the internal shear strength of the paper under dry conditions at room temperature for Examples B, E and D.

The higher the shear strength, the better mechanical strength the friction material has which means that more pressure is needed to shear the friction lining.

TABLE 4

| | Shear Strength PSI |
|---|---|
| Ex. B | 382.5 |
| | 382.5 |
| Ex. E | 325.0 |
| | 290.0 |
| Ex. D | 352.5 |
| | 385.0 |

EXAMPLE 5

The silicone-phenolic resin blend provides at least about a 50% increase in the "burn off" temperature of the friction material. This high friction stability is an advantage over the currently available friction materials. A thermal gravimetric analysis (TGA) shown in FIG. 2, wherein the TGA curve shifts to higher temperatures, indicates increased heat resistance of the silicone-phenolic resin blend over the phenolic material.

Both Examples A and B have improved heat resistance over conventional materials and Example B is especially suitable for end-use friction material applications where heat resistance is a critical criterion.

Figure 2:
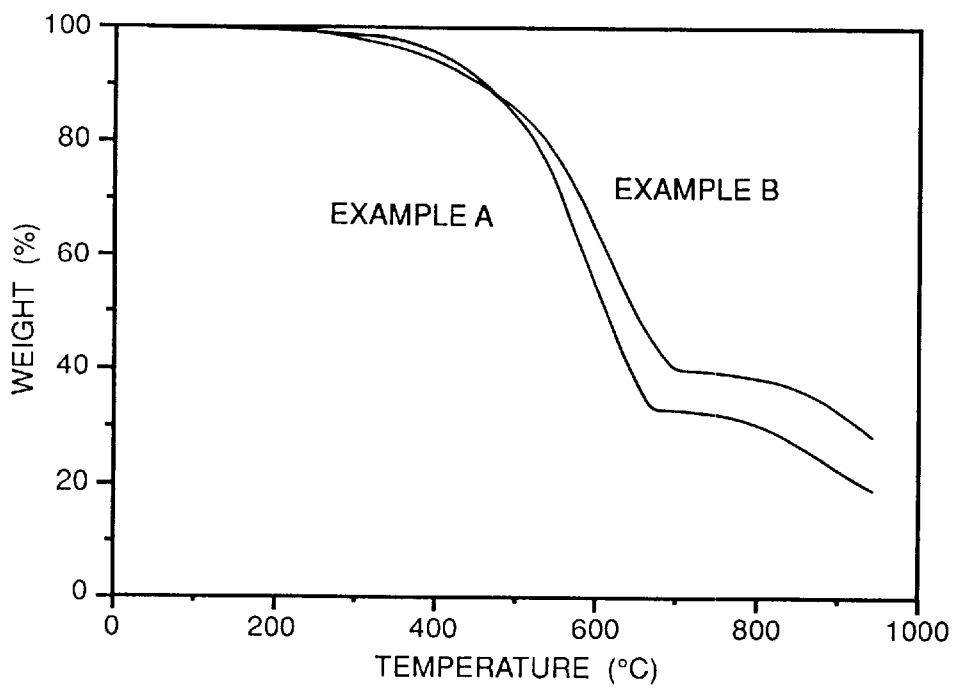
FIG. 2 is a thermal gravimetric analysis (TGA) graph showing the relationship between the percent of weight change and increases temperatures for a fibrous base material impregnated with a phenolic resin (Example A) or a fibrous base material impregnated with a silicone-phenolic resin blend (Example B).
Figure 3:
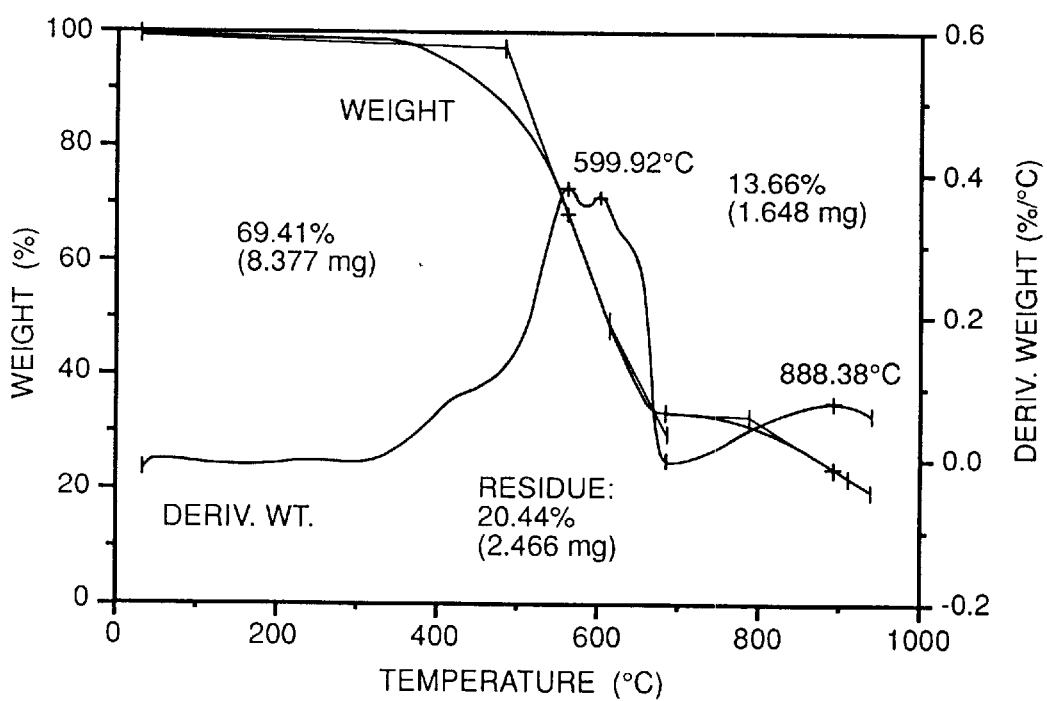
FIG. 3 is a TGA graph showing the percent of weight loss as temperatures increase, the change in the derivative weight (%/° C.), and the amount and percent of residue for Example A shown in FIG. 2.
Figure 4:
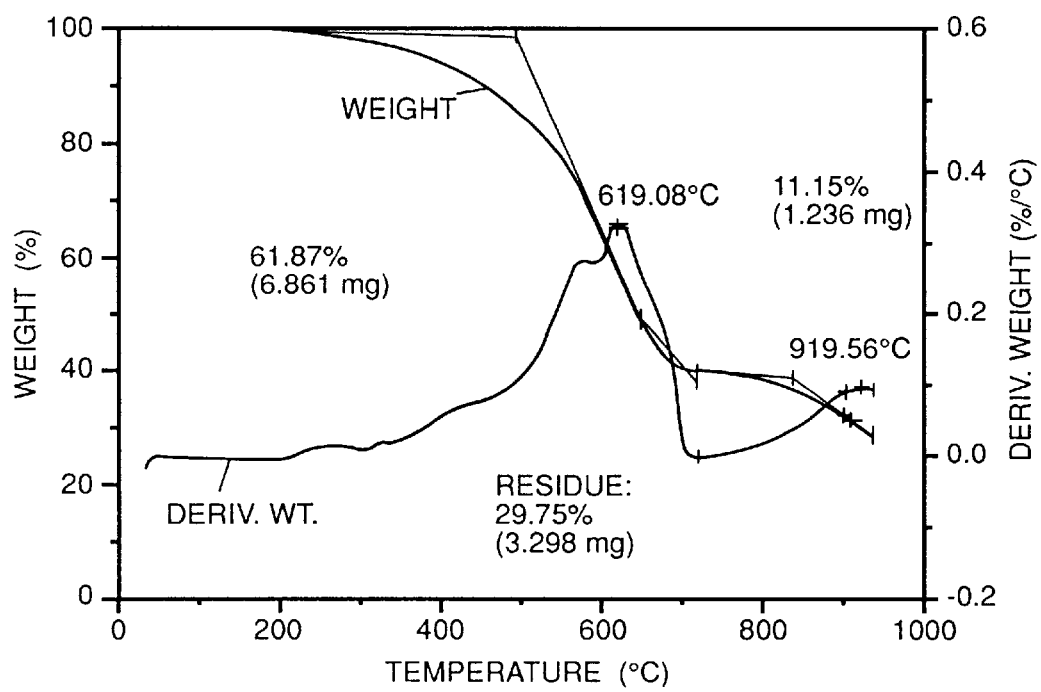
FIG. 4 is a TGA graph showing the percent of weight loss as temperatures increase, the change in the derivative weight, and the amount and percent of for Example B shown in FIG. 2.

FIGS. 3 and 4 compare the TGA graphs shown in FIG. 2, and the change in derivative weight (%/° C.) for the phenolic resin, Example A in FIG. 2 (FIG. 3) and the silicone-phenolic blend, Example B in FIG. 2 (FIG. 4). The percent change in weight for the phenolic resin was 69.41% while the percent change in weight for the silicone-phenolic blend was 61.87%. As seen from FIGS. 3–4, the more rapid the weight loss, the less heat resistance the friction material possess.

EXAMPLE 6

Figure 5:
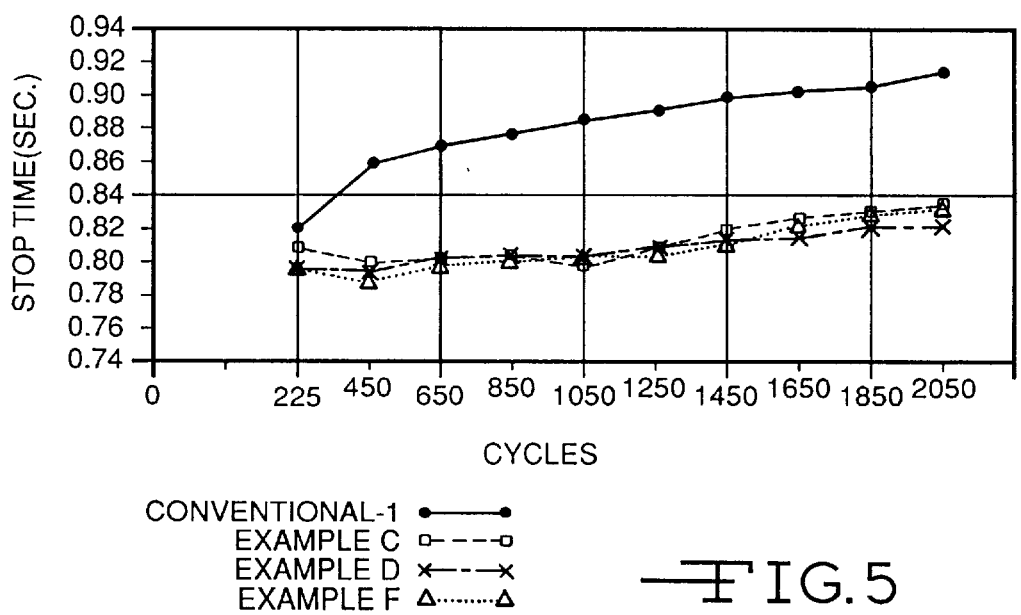
FIG. 5 is a graph showing the stop time in seconds as the number of cycles increases for a conventional material impregnated with a butadiene phenolic resin (Conventional-1) as compared to a fibrous base material impregnated with a silicone-phenolic resin blend (Example C) and a fibrous base material impregnated with different epoxy-phenolic resins (Example D 0.016 inch thin lining and Example F 0.020 inch thick lining).

FIG. 5 shows the stop time as the number of cycles increases for various materials: Example C, D and F as compared to the Conventional-1 material impregnated with a butadiene-phenolic resin. The fibrous materials (Examples C, D and F) maintained a relatively uniform stop time, while the stop time for the conventional material rapidly rose to unacceptable levels.

Figure 6:
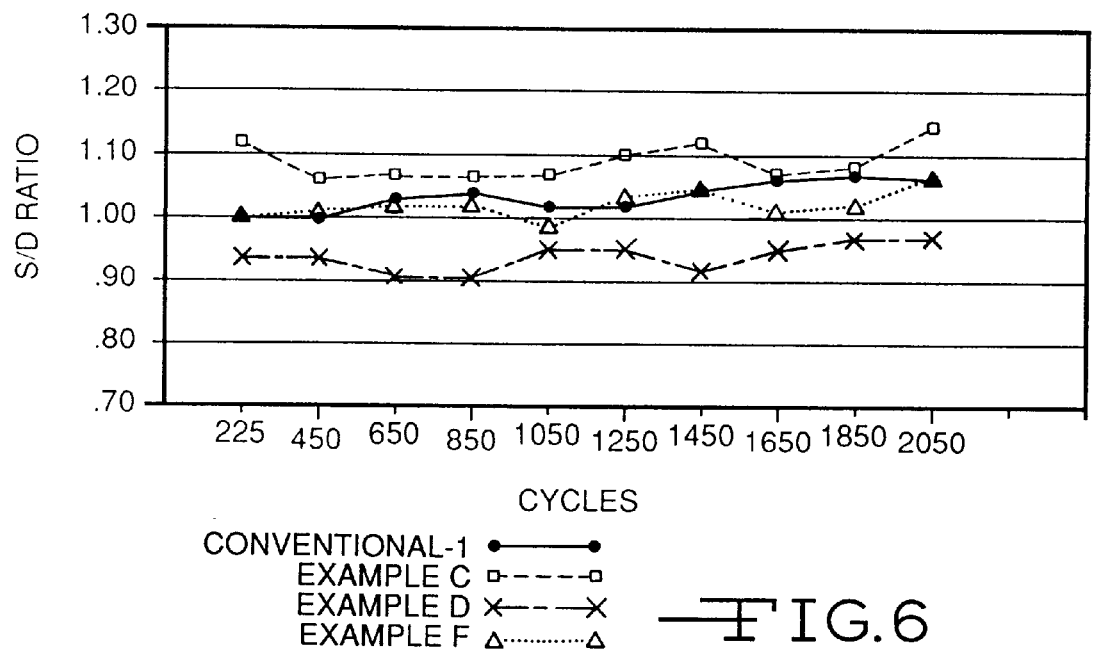
FIG. 6 is a graph showing the ratio of static to dynamic coefficient of friction performance as the number of cycles increases for the Conventional-1 material as compared to the Examples C, D and F materials.

The ratio between the static coefficient of friction and the dynamic coefficient of friction as the number of cycles increases was compared for Examples C, D and F and for the Conventional-1 material. As can be seen in FIG. 6, the fibrous base material impregnated with silicone-phenolic blend material (Example C) performs consistently better than the conventional material while the fibrous base material impregnated with epoxy-phenolic resins (Examples D and F) performed comparatively well.

Figure 7:
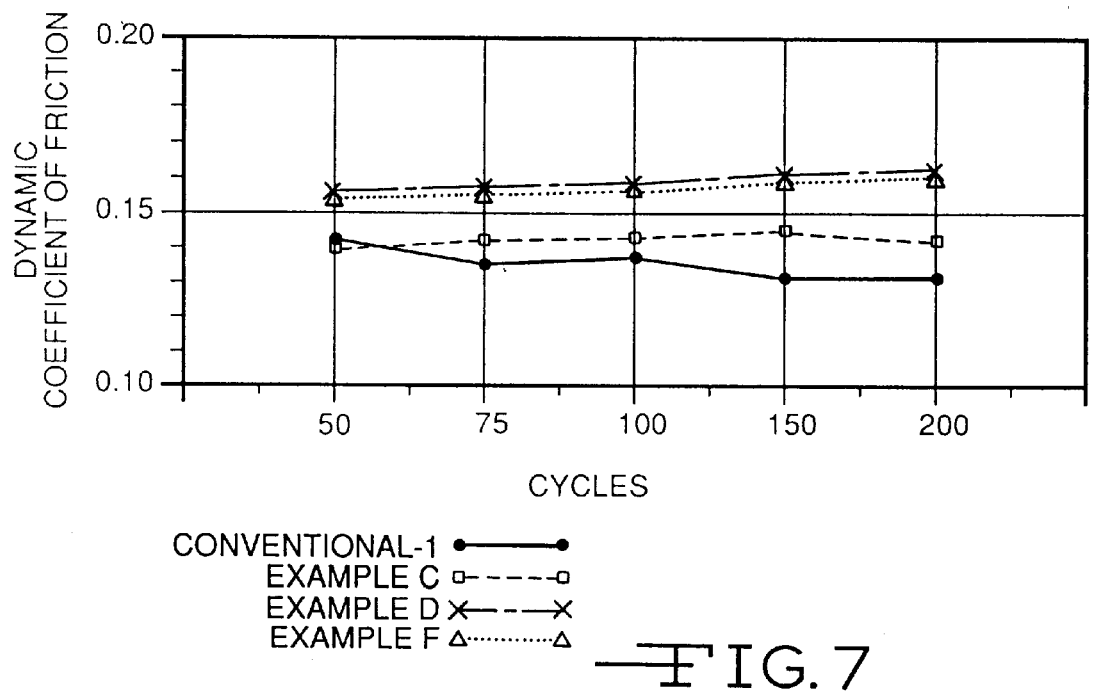
FIG. 7 is a graph showing the dynamic coefficient of friction performance as the number of cycles increases for the Conventional-1 material as compared to the Examples C, D and F materials.

The dynamic coefficient of friction as the number of cycles increase was compared for Examples C, D and F and for the conventional material (Conventional-1). FIG. 7 shows the dynamic coefficient of friction for the friction materials (Examples C, D and F) remain relatively steady as the number the cycles increased. Thus, the fibrous base materials perform much better at a high speed than the conventional material. It is important to note that there is no "fall off" of the coefficient of friction as the number of cycles increases for the fibrous base materials.

Figure 8:
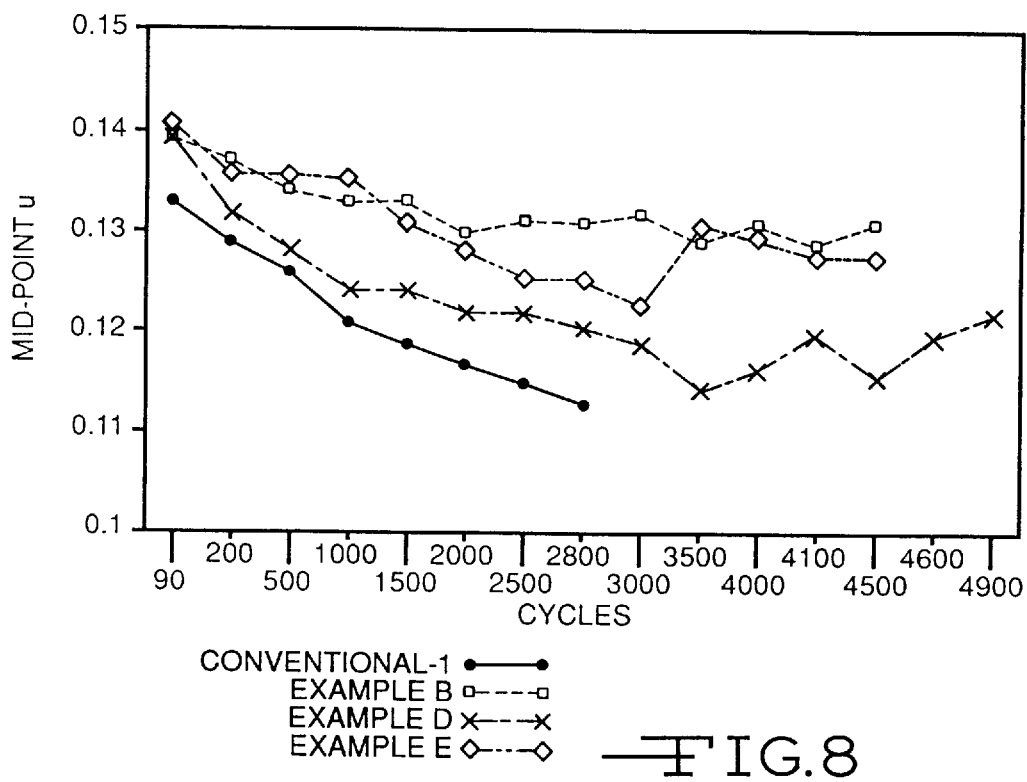
FIG. 8 is a graph showing the dynamic mid point coefficient friction performance as the number of cycles increases for the Conventional-1 material as compared to Examples B, D and a fibrous base material impregnated with a different epoxy phenolic resin (Example E).
Figure 9:
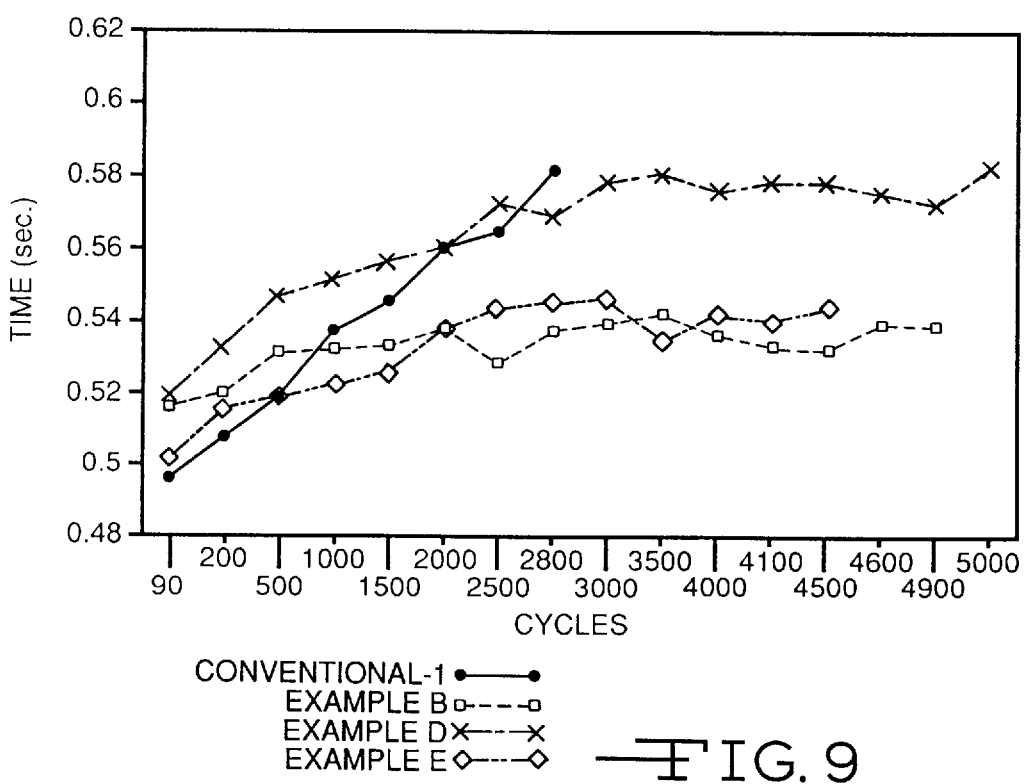
FIG. 9 is a graph showing the stop time performance as the number of cycles increases for the Conventional-1 material as compared to the Examples B, D and E materials.

A materials evaluation for a clutch run at 6,600 rpm (65 m/sec.), limited lubrication of 0.2 gpm was conducted for Examples B, D and E and for the Conventional-1 material. The dynamic mid point coefficient graphs of FIG. 8 shows that the conventional material was totally unacceptable while the friction Examples B, D and E materials have a relatively steady coefficient of friction indicating that the system was very stable. As can be seen in FIG. 9, the stop time for the conventional material rapidly increased to unacceptable levels while the friction materials (Examples B, D and E) maintained an acceptably short stop time of about 0.52 to about 0.58 seconds throughout the test.

EXAMPLE 7

In certain embodiments, it is preferred that the target pick up of resin by the friction material range from about 40 to about 65%, and, in certain embodiments, about 60 to at least 65%, by weight, total silicone-phenolic resin. After the fibrous base material is impregnated with the resin, the fibrous base material is cured for a period of time (in certain embodiments for about ½ hour) at temperatures ranging between 300–400° C. to cure the resin binder in the friction material. The final thickness of the friction material depends on the initial thickness of the fibrous base material and, in certain embodiments, preferably ranges from about 0.014" to about 0.040".

In Table 5 below, a friction material comprising the fibrous base material impregnated with about 60% resin pick up (P.U.) of a silicone-phenolic resin (Example C) was compared to a friction material comprising the same fibrous base material as in Example C but impregnated with a phenolic resin with about 60% resin pick up (P.U.) (Example C-1) and to the Conventional-1 material impregnated with a phenolic resin with about 49% P.U. (Conventional-1). Assembly or core plates were lined with friction materials impregnated with the tested resins to form a pack for testing. The dynamic coefficient of friction remained steady (with a loss of only 5%) as the number of cycles increased for the silicone-phenolic resin friction materials. There was no lining wear on the plates using the silicone-phenolic resin friction material. The lining condition of the silicone-phenolic resin blend friction material remained good without breakouts, abrasion, or glazing occurring. Further, the steel condition of the separator plates show no hot spots for the silicone-phenolic blend friction materials.

TABLE 5

EFFECT OF RESIN CHANGE

| TEST RESIN % | CONV'L - 1 49% P.U. | EX. C-1 60% P.U. | EXAMPLE C 60% P.U. |
|---|---|---|---|
| LINING THICKNESS CYCLES | 0.016" | 0.016" | 0.016" |
| | MID. DYNAMIC | | |
| 75 | 0.135 | 0.134 | 0.134 |
| 3,000 | 0.121 | 0.123 | 0.130 |
| 6,000 | 0.118 | 0.113 | 0.127 |
| | STOP TIME SEC. | | |
| 75 | 0.804 | 0.799 | 0.796 |
| 3,000 | 0.880 | 0.858 | 0.817 |
| 6,000 | 0.904 | 0.910 | 0.835 |
| TORQUE CURVE SHAPING | Decrease | Decrease | Decrease |
| LINING LOSS PER PLATE | 0.0027" | 0.0009" | No Loss |
| LINING CONDITION | Breakouts Heavy Glaze | Abrasion Glaze | Good |
| STEEL CONDITION | Distinct Hot Spots | Few Small Hot Spots | Light Heat Stains |

EXAMPLE 8

Table 6 below shows compression/relaxation studies done on an MTS machine. This test reports the effect on paper caliper caused by repeatedly pressing on a sample and releasing the sample through a series of different pressures. These readings provide an indication of the internal resistance to set or compacting due to pressing. The Example B material shows a greater elasticity than the comparative example described in Table 2 above. This greater elasticity allows for more uniform heat dissipation during use of the friction material since the fluid in the transmission or brake can rapidly move through the porous structure. Further, the increased elasticity provides more uniform pressure or even pressure distribution on the friction material such that uneven lining wear or separator plate "hot spots" are eliminated.

TABLE 6

LOAD VS DEFLECTION
Compression/compression Set

| Pressure Psi | Example B | Compar. |
|---|---|---|
| 15 psi | .0000"/1 in. .0000" | .0000"/1 in. .0000" |
| 50 psi | .0180"/1 in. .0066" | .0104"/1 in. .0034" |
| 100 psi | .0348"/1 in. .0083" | .0233"/1 in. .0049" |
| 200 psi | .0600"/1 in. .0115" | .0419"/1 in. .0070" |
| 300 psi | .0805"/1 in. .0123" | .0565"/1 in. .0076" |
| 400 psi | .0963"/1 in. .0159" | .0658"/1 in. .0070" |
| 500 psi | .1112"/1 in. .0188" | .0742"/1 in. .0079" |
| 700 psi | .1369"/1 in. .0232" | .0939"/1 in. .0111" |
| 900 psi | .1533"/1 in. .0242" | .1090"/1 in. .0134" |
| 1100 psi | .1703"/1 in. .0267" | .1248"/1 in. .0152" |
| 1300 psi | .1922"/1 in. .0324" | .1419"/1 in. .0190" |
| 1500 psi | .2179"/1 in. .0404" | .1630"/1 in. .0248" |

EXAMPLE 9

Figure 10:
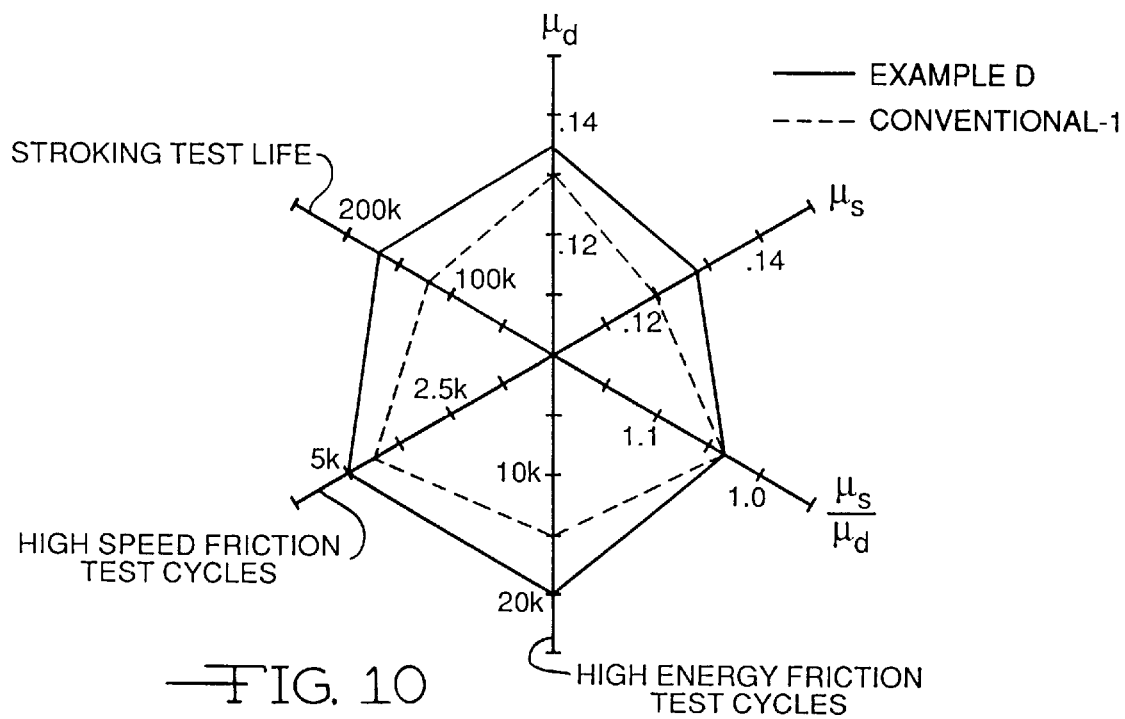
FIG. 10 is a graph showing high energy friction test cycles for a conventional material impregnated with a phenolic resin (Conventional-1) as compared to fibrous base material impregnated with an epoxy-phenolic resin (Example D).

A friction material comprising less fibrillated aramid fibers and synthetic graphite impregnated with an epoxy modified phenolic resin (Example D) and was compared to the conventional material (Conventional-1). A high speed friction cycles test is shown in FIG. 10, comparing the stroking test life and high energy friction test cycles. The friction material of the present invention performs better in all aspects than the conventional friction material.

Figure 11:
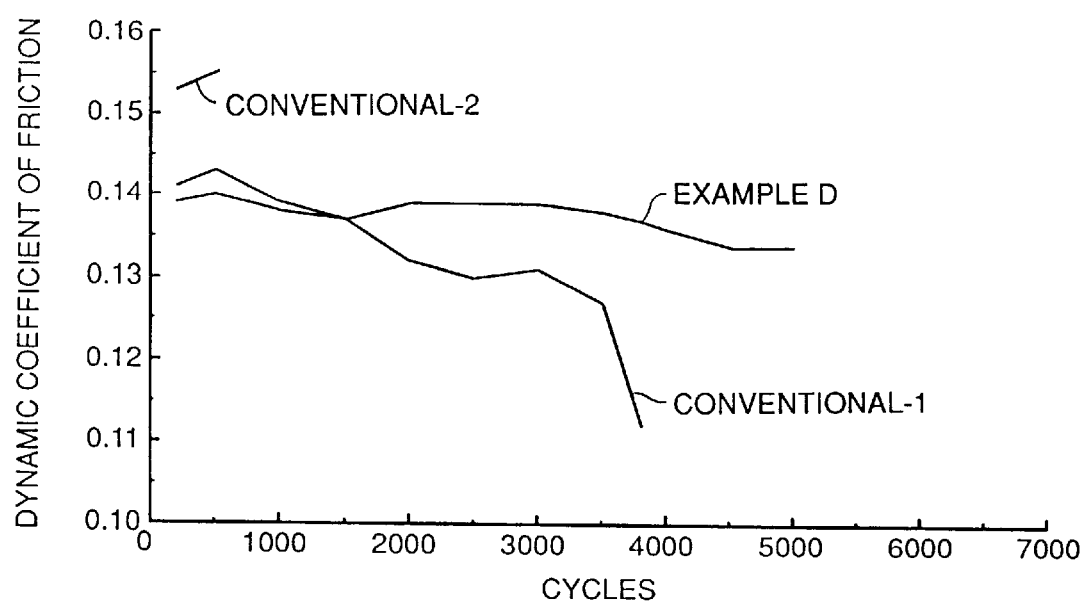
FIG. 11 is a graph showing the high speed durability test at 7,000 rpm, 0.3 LPM oil flow 1.5 kg-cm-sec$^2$ inertia showing the dynamic coefficient of friction as the number of cycles increases for a fibrous base friction material impregnated with an epoxy-phenolic resin (Example D) and the Conventional-1 material and a conventional friction material impregnated with a phenolic resin (Conventional-2).

FIG. 11 shows the results of a high speed durability test at 7,000 rpm, 0.3 LPM oil flow with 1.5 kg-cm-sec$^2$ inertia. As the number of cycles increases, the dynamic coefficient of friction remained relatively uniform for the friction material (Example D) while one conventional material (Conventional-2) failed at the beginning of the test and the performance of another conventional material impregnated with a phenolic-based resin (Conventional-1) rapidly fell off after about 3,000 cycles.

Figure 12:
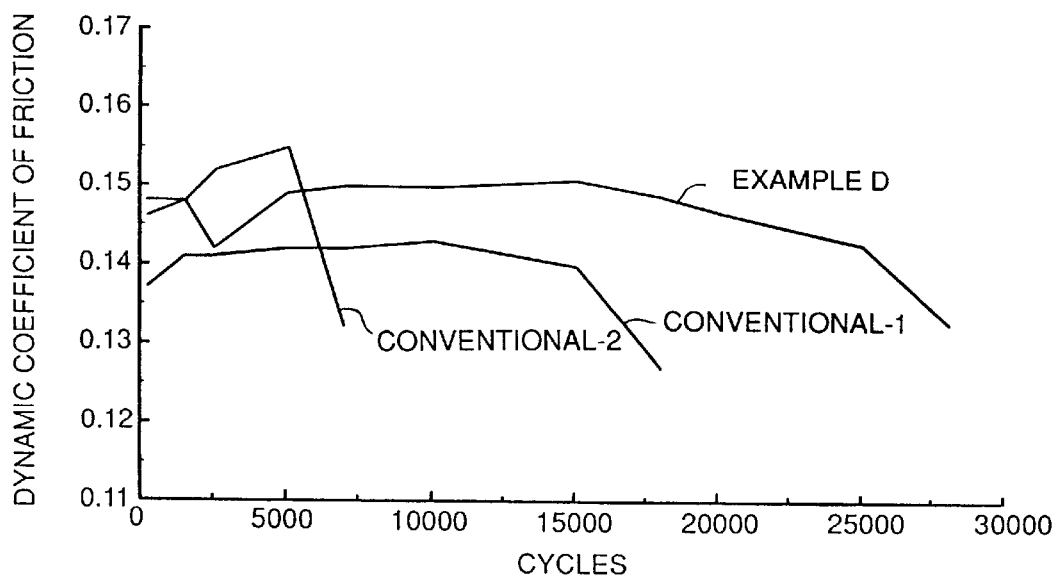
FIG. 12 is a graph showing the high energy durability test at 3,600 rpm, 8.0 kg/cm$^2$ lining pressure, 5.0 kg-cm-sec$^2$ inertia showing the dynamic coefficient of friction as the number of cycles increases for a Example D and the two conventional materials, Conventional-1 and Conventional-2.

FIG. 12 shows the results of a high energy durability test at 3,600 rpm, 8.0 kg/cm$^2$ lining pressure at 5.0 kg-cm-sec$^2$ inertia. The dynamic coefficient of friction for the friction material (Example D) remained remarkably steady throughout the entire durability test. In comparison, the conventional materials failed at an unacceptably short cycle of usage life.

Figure 13:
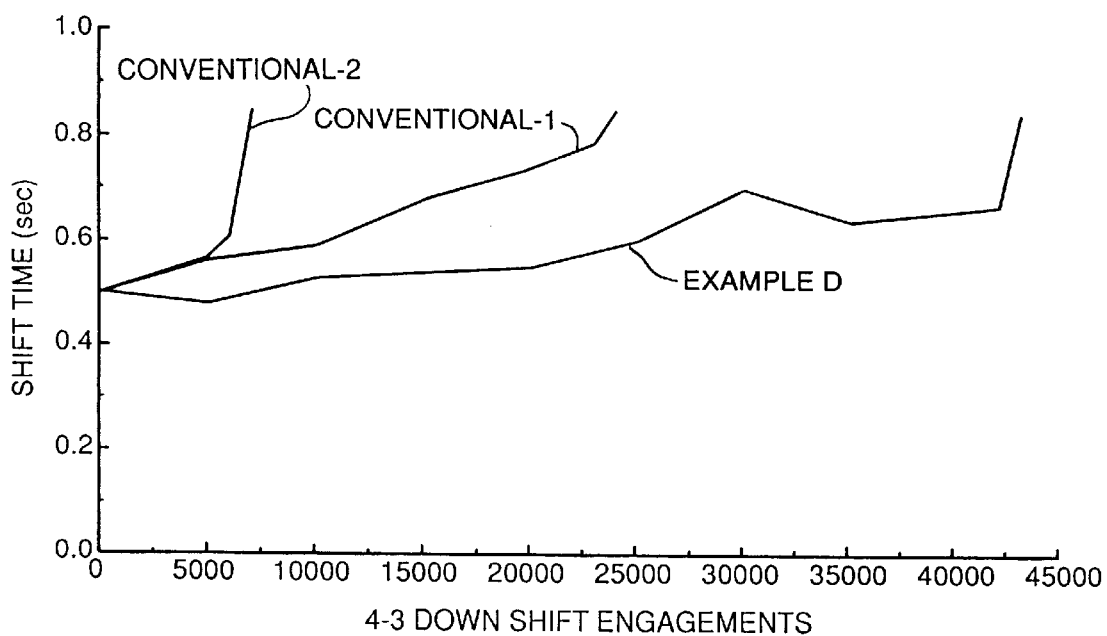
FIG. 13 is a graph showing the engine dynamometer 4-3 down shift durability test, 2,000 cc IG/FE engine, 5,800 rpm showing the shift time in seconds for the 4-3 down shift engagements for the Example D and the two conventional friction materials, Conventional-1 and Conventional-2.

FIG. 13 shows the results of an engine dynamometer 4-3 down shift durability test for a 2,000 cc IG/FE engine at 5,800 rpm. As can be seen, the shift time in seconds for the 4-3 down shift engagements for the friction material (Example D) remain relatively constant through at least 40,000 down shift engagements. The conventional materials had rapid increases in shift time at low shift engagement cycles.

EXAMPLE 10

Figure 14:
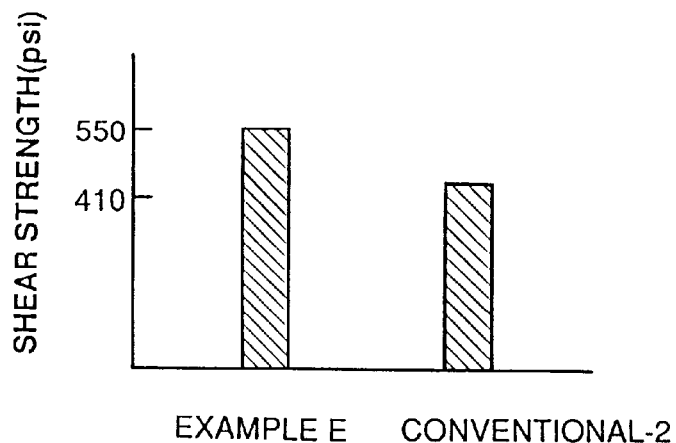
FIG. 14 is a graph comparing the shear strength (psi) for a fibrous base material impregnated with an epoxy-phenolic resin (Example E) and a conventional material (Conventional-2).

The friction material of the present invention has high durability and high delamination resistance. The shear strength (psi) for the friction material of the present invention is greater than for the conventional materials, as seen in FIG. 14. The use of the less fibrillated fibers and the resulting pore structure of the friction material provides increased thermal resistance to the friction material. The fiber geometry not only provides increased thermal resistance, but also provides delamination resistance and squeal resistance. The presence of the synthetic graphite particles and at least one filler material aids in increasing the thermal resistance, maintaining a steady coefficient of friction, and increasing the squeal resistance.

EXAMPLE 11

Figure 15:
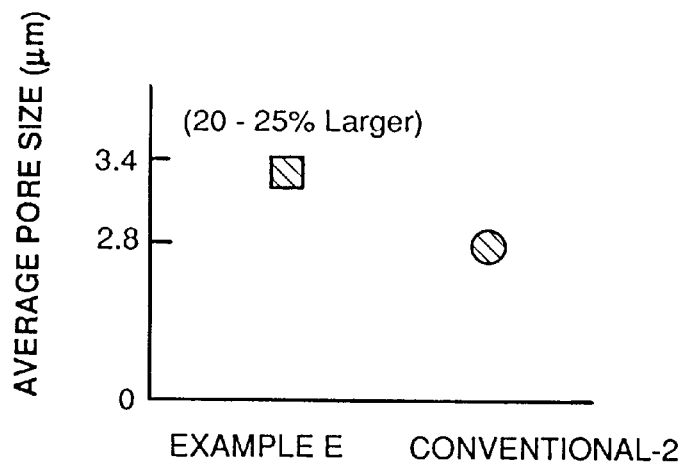
FIG. 15 is a graph showing the pore size (in microns) for a fibrous base material impregnated with an epoxy-phenolic resin (Example E) and a conventional material (Conventional-2).

The average pore size for the friction material of the present invention as compared to the pore size of a conventionally resin impregnated friction material is shown in FIG. 15. The average pore size of the friction lining of the present invention ranges from about 2.0 to about 15 microns and is between about 20 to about 100% larger than for the conventional friction materials.

EXAMPLE 12

Figure 16:
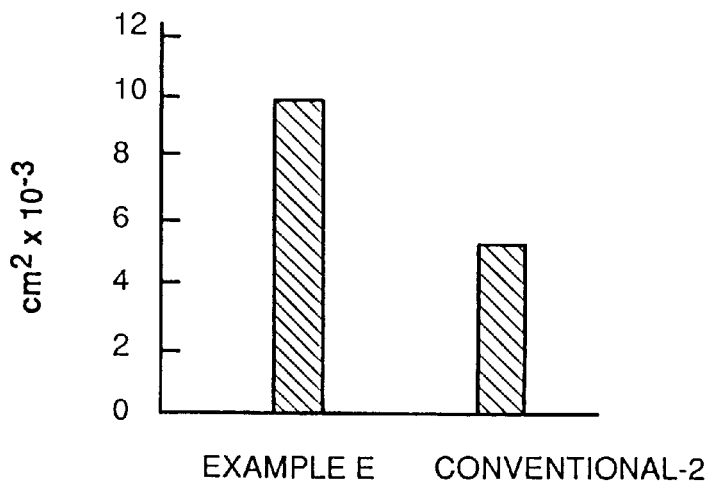
FIG. 16 is a graph comparing the liquid permeability (cm$^2 \times 10^{-3}$) for a fibrous base material impregnated with an epoxy-phenolic resin (Example E) and a conventional material (Conventional-2).

The liquid permeability for the friction material of the present invention was compared to a conventional material impregnated with a phenolic resin (Conventional-2). As seen in FIG. 16, the friction material of the present invention has about a 20% increase in liquid permeability over the conventional materials.

EXAMPLE 13

Figure 17:
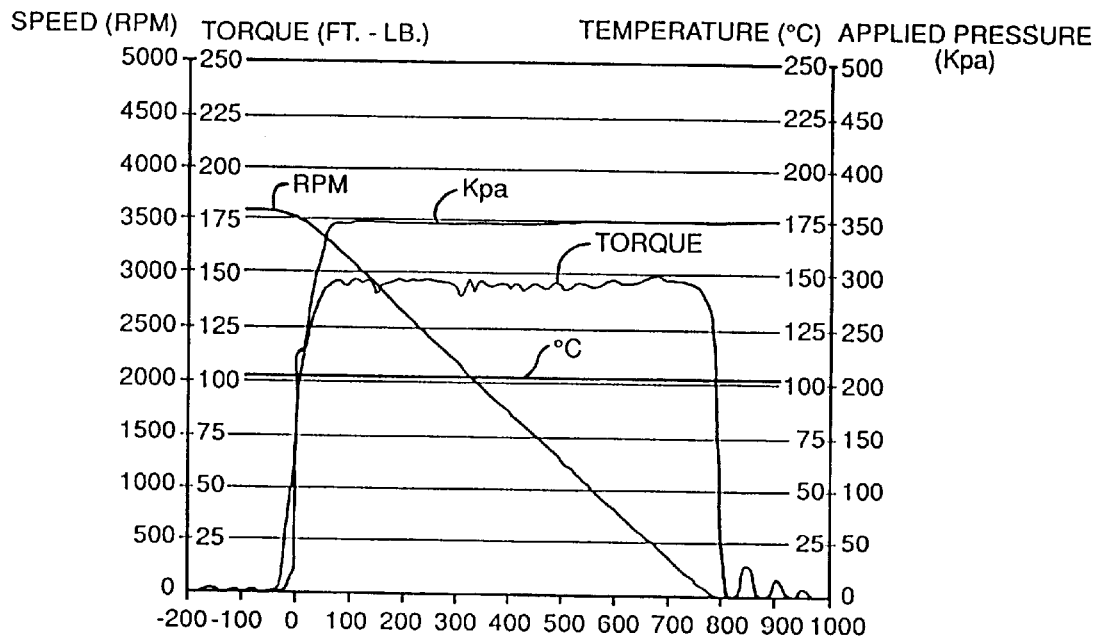
FIG. 17 is a graph showing the speed, torque, temperature and applied pressure for Example E at an interface temperature of about 695° F. for 500 cycles.

FIG. 17 shows a friction material (Example D) comprising about 0.02" lining with about 44% pick up of a phenolic-epoxy resin at about 380° F. after ½ hour cure at an interface temperature of about 695° F. FIG. 17 compares the speed, torque, temperature and applied pressure of the material run at 500 cycles showing the high friction stability of the friction material of the present invention.

Figure 18:
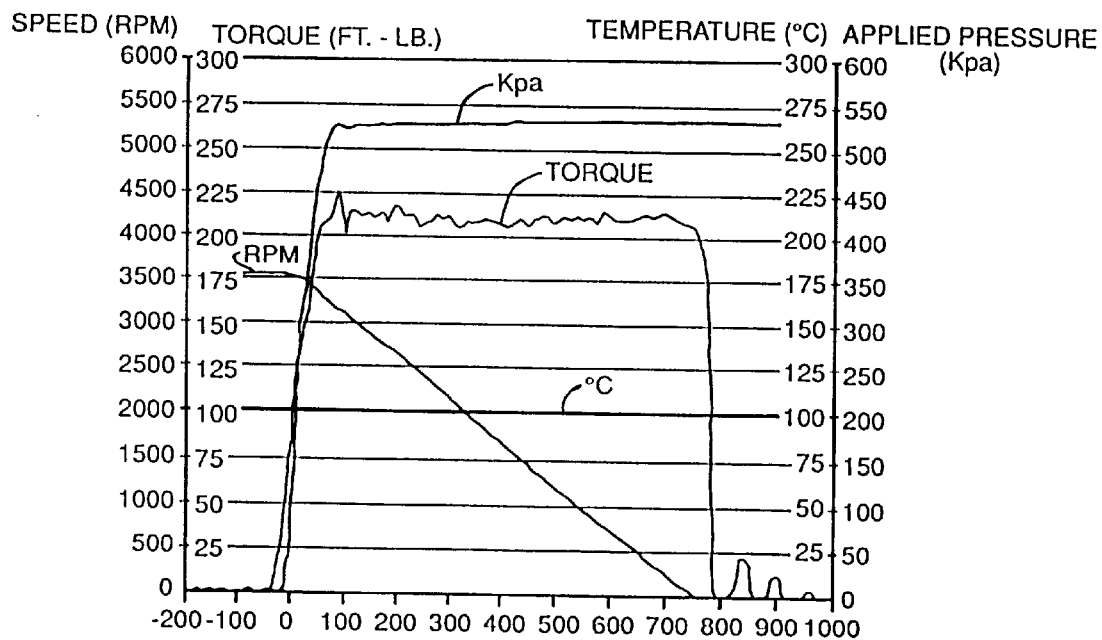
FIG. 18 is a graph showing the speed, torque, temperature and applied pressure for Example E at an interface temperature of about 896° F. for 10,500 cycles.

FIG. 18 shows the high friction stability of the friction material (Example D) comprising a 0.02" lining with about a 44% resin pick up of another phenolic-based resin cured at 380° F. for ½ hour, at an interface temperature of 895° F. FIG. 18 shows the speed, torque, temperature and applied pressure of the material run for 10,500 cycles.

Figure 19:
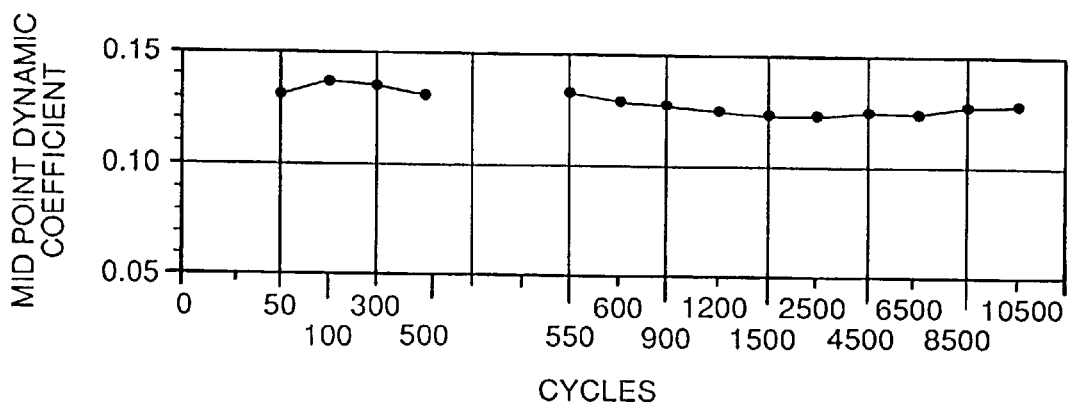
FIG. 19 is a graph showing the mid point dynamic coefficient of friction for Example E as the number of cycles increases.

Table 7 below shows the mid point coefficient of friction for the friction material (Example D) shown in FIGS. 17 and 18. The coefficient of friction remains relatively steady as the cycles increase, thus showing the high friction stability of the friction material. Also, as shown in FIG. 19, the mid point dynamic coefficient of friction for the above described friction materials in FIGS. 17 and 18 show that as the number of cycles increased, the mid point coefficient of friction remained relatively steady. The torque curve shape shows that the friction material of the present invention is especially useful in high speed, high energy and high temperature applications. The total loss of friction material was only about 0.0077 inches and a loss per plate was about 0.0039 inches. The friction material showed a medium glaze and the separator was only light heat stained, thus indicating a high quality friction material which is stable over a long period of time.

TABLE 7

Example D

| CYCLES | MID COEFFICIENT |
|---|---|
| 50 | .132 |
| 100 | .136 |
| 300 | .135 |
| 500 | .131 |
| 550 | .131 |
| 600 | .129 |
| 900 | .124 |
| 1200 | .122 |
| 1500 | .121 |
| 2500 | .121 |
| 4500 | .122 |
| 6500 | .121 |
| 8500 | .123 |
| 10500 | .126 |

EXAMPLE 14

Figure 20:
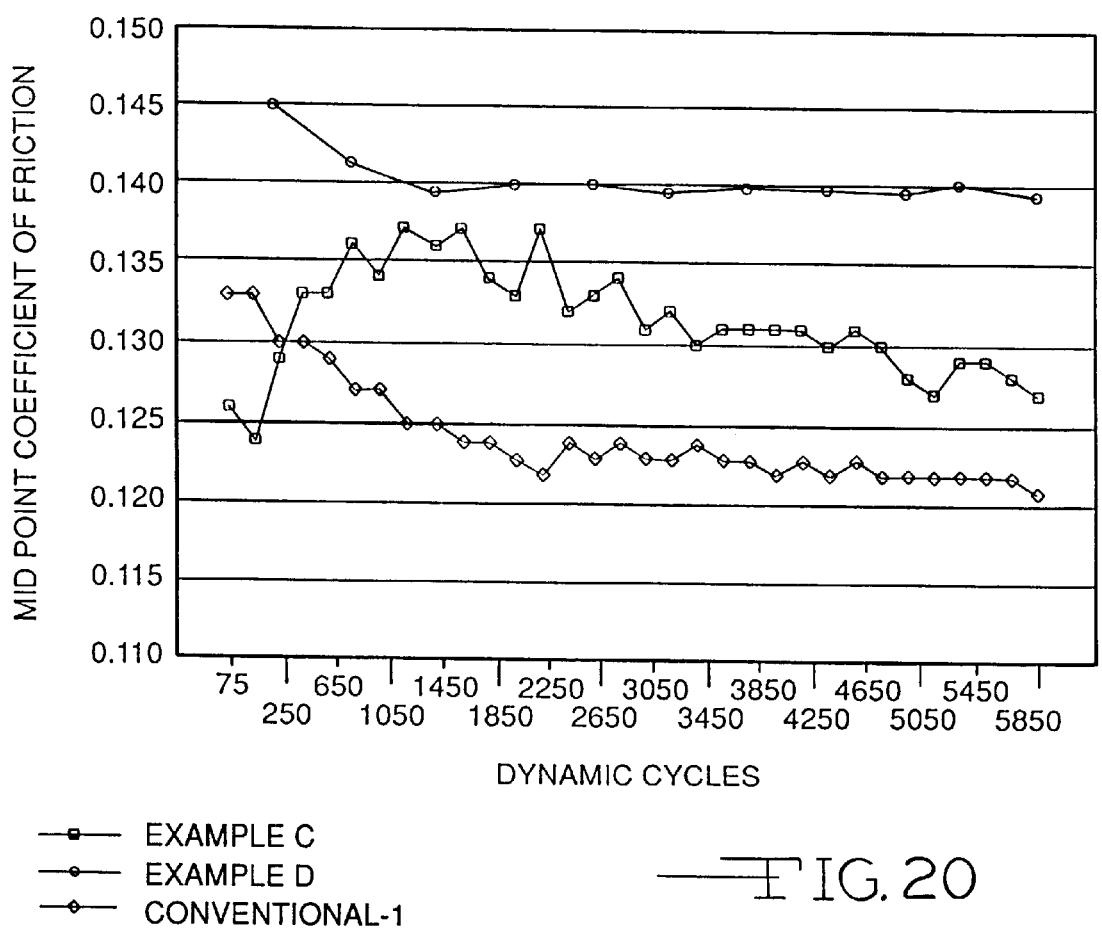
FIG. 20 is a graph showing the high speed durability showing the mid point coefficient of friction as the number of cycles increases for Examples C and E, as compared to the Conventional-1 material.

FIG. 20 shows a high speed durability test comparing a conventional phenolic-based material impregnating a conventional friction lining to one embodiment of the friction material of the present material impregnated with a silicone-phenolic resin blend material (Example C) and another embodiment of the friction material of the present invention impregnated with a phenolic-epoxy resin material (Example D). Both the friction materials of the present invention had more stable mid point coefficients of friction than the conventional friction material.

Figure 21:
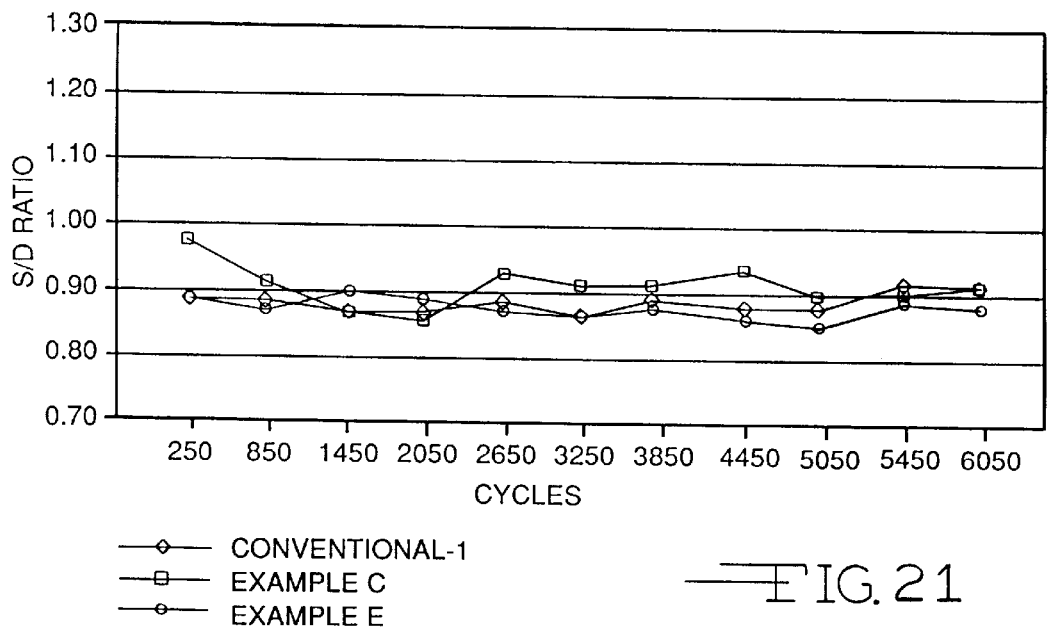
FIG. 21 is a graph showing a high speed durability at 6,000 rpm using an Exxon 1975 fluid showing the static to dynamic coefficient of friction ratio as the number of cycles increases for Examples C and E, as compared to the Conventional-1 material.

A high speed durability test run at 6,000 rpm was conducted comparing the static to dynamic (S/D) coefficient of friction over a number of increasing cycles. As seen in FIG. 21, the conventional phenolic impregnated friction material was compared to a silicone-phenolic impregnated friction material of the present invention (Example C) and epoxy-phenolic impregnated friction material (Example E) of the present invention. The materials of the present invention have favorable static to dynamic coefficient of friction ratios to the conventional material.

Figure 22:
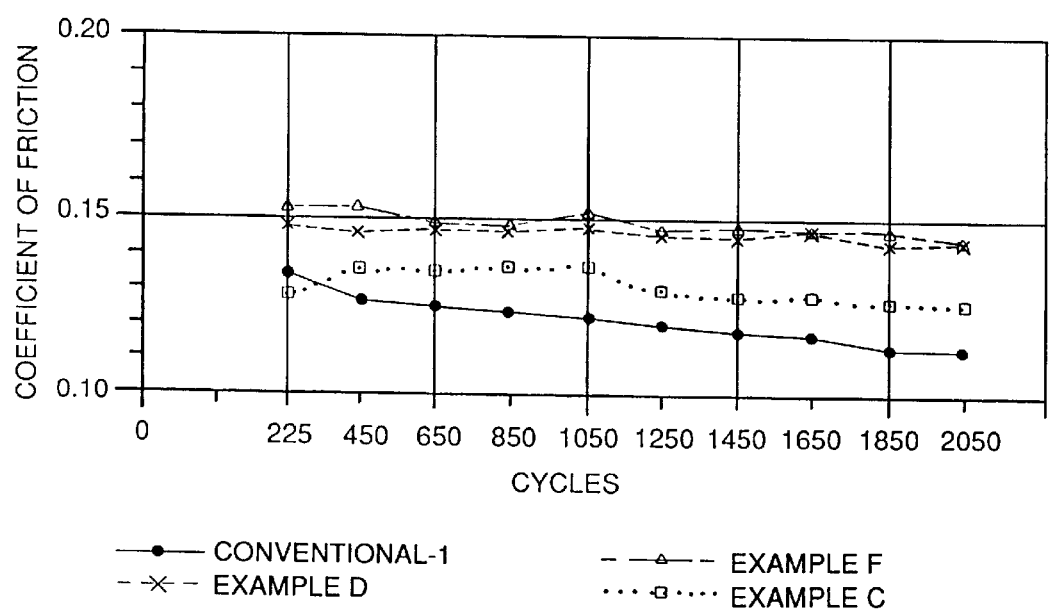
FIG. 22 is a graph showing a high speed durability test at 6,000 rpm using an automatic transmission fluid JWS2318K showing the coefficient of friction as the number of cycles increases for Examples C, D and F, as compared to the Conventional-1 material.

The coefficient of friction as cycles increase at 6,000 rpm was tested for three samples of the fibrous base material of the present invention, each impregnated with a resin as follows: phenolic-epoxy impregnated resin at a 0.016 inch thin fibrous base material (Example D), phenolic-based resin impregnated at 0.020 inch thick fibrous base material (Example F), and a silicone-phenolic resin (Example C). As seen in FIG. 22, these fibrous base materials impregnated with the various resins compared favorably to a conventional friction material, which performed more poorly than each of the friction materials of the present invention.

The following further examples provide additional evidence that a fibrous base material comprising at least one type of aramid fiber having a CSF of greater than about 530 preferably about 580–640 and most preferably about 620–640 is especially useful in friction materials. Such fibrous base materials are an improvement over other types of fibrous base materials. Various comparative examples and various preferred embodiments are described in the following examples, which however, are not intended to limit the scope of the invention. Each of the following examples, Comparative 3, Comparative 4 and Examples G, H, I and J is a formulation which is a fibrous base material comprising, in percent, by weight, about 20% synthetic graphite, about 25% diatomaceous earth, about 30% cotton fibers, and varying types of fibers:

Comparative Ex. 3 about 25% epoxy coated aramid fibers (1 mm in length);

Comparative Ex. 4 about 25% epoxy coated aramid fibers (3 mm in length);

Example G about 25% aramid fibers-CSF about 540;

Example H about 25% aramid fibers-CSF about 585;

Example I about 25% aramid fibers-CSF about 620–640; and

Example J about 25% aramid fibers-CSF about 450–500.

EXAMPLE 15

The mean pore diameter and Darcy's permeability for Comparative 3, Comparative 4 and Examples G, H and I are shown in Table 8 below for both resin saturated fibrous base materials and for raw papers (unsaturated).

The higher mean flow pore diameter indicates that the friction material is more likely to have lower interface temperature with more efficient heat dissipation in a transmission due to better automatic transmission fluid flow of material throughout the porous structure of the friction material. During operation of a transmission system, oil deposits on the surface of a friction material tend to develop over time due to a breakdown of automatic transmission fluid, especially at high temperatures. The oil deposits on the fibers decrease the pore openings. Therefore, when a friction material initially starts with larger pores, there are more open pores remaining during the useful life of the friction material. It is noted that Example I (comprising less fibrillated aramid fibers (CSF about 620–640)) has especially desirable mean pore diameters.

TABLE 8

| Paper ID | Bond Cond. Time/min. Temp ° F. FLT/in. | Pore Mean Pore Dia. (μm) | L-Prem Darcy Const. |
| --- | --- | --- | --- |
| Compar. 3 | 0.017 | 15.1 | 0.23 |
| Compar. 4 | 0.017 | 23.9 | 0.26 |
| Ex. G | 0.017 | 4.3 | 0.04 |
| Ex. H | 0.017 | 5.4 | 0.04 |
| Ex. I | 0.017 | 7.0 | 0.12 |
| RAW PAPER | | | |
| Compar. 3 | | 25.9 | 0.50 |
| Compar. 4 | | 26.3 | 0.64 |
| Ex. G | | 5.5 | 0.06 |

TABLE 8-continued

| Paper ID | Bond Cond. Time/min. Temp ° F. FLT/in. | Pore Mean Pore Dia. (μm) | L-Prem Darcy Const. |
| --- | --- | --- | --- |
| Ex. H | | 6.0 | 0.11 |
| Ex. I | | 7.8 | 0.12 |

EXAMPLE 16

Table 9 below indicates the compression, compression set and shear strength values for the Comparative 3, Comparative 4 and Examples G, H and I. It is to be especially noted that Examples G, H and I have acceptable compression and compression set values and further that the shear strength is much greater than Comparatives 3 and 4.

TABLE 9

| Friction Material ID | Comp. in./in. | Comp. Set in./in. | Shear Strength psi |
| --- | --- | --- | --- |
| | 100 psi | 100 psi | A |
| | 300 psi | 300 psi | B |
| | 700 psi | 700 psi | C |
| | 1500 psi | 1500 psi | Avg. |
| Compar. 3 | 0.0608 | 0.0141 | 128 |
| | 0.1222 | 0.0232 | 126 |
| | 0.1847 | 0.0426 | 126 |
| | 0.2999 | 0.1049 | 127 |
| Compar. 4 | 0.0771 | 0.0188 | 83 |
| | 0.1448 | 0.0309 | 89 |
| | 0.2078 | 0.0488 | 90 |
| | 0.2955 | 0.0821 | 87 |
| Ex. G | 0.0157 | −0.0005 | 364 |
| | 0.0475 | 0.0002 | 357 |
| | 0.0943 | 0.0108 | 341 |
| | 0.1946 | 0.0510 | 354 |
| Ex. H | 0.0206 | 0.0017 | 313 |
| | 0.0528 | 0.0030 | 325 |
| | 0.0978 | 0.0118 | 317 |
| | 0.1721 | 0.0414 | 318 |
| Ex. I | 0.0196 | 0.0000 | 332 |
| | 0.0546 | 0.0015 | 349 |
| | 0.1119 | 0.0110 | 336 |
| | 0.2321 | 0.0482 | 339 |

EXAMPLE 17

The Table 10 shows improved heat resistance over comparative examples and contains data showing the TMA, the differential scanning calorimeter (DSC) and thermal gravimetric analysis (TGA) data for the comparatives 3 and 4 and Examples G, H and 1.

TABLE 10

| Paper ID | TMA Alpa Onset ° C. % Expan | DSC Onset ° C. Peak ° C. J/G | TGA-Total %/Temp. ° C. 1st Peak 2nd Peak 3rd Peak Residue | TGA-Top %/Temp. ° C. 1st Peak 2nd Peak 3rd Peak Residue | TGA-Mid. %/Temp. ° C. 1st Peak 2nd Peak 3rd Peak Residue | TGA-Bot. %/Temp. ° C. 1st Peak 2nd Peak 3rd Peak Residue |
| --- | --- | --- | --- | --- | --- | --- |
| Compar. 3 | 650 | 190 | 18.81 | 19.40 | 20.67 | 20.64 |
| | 90 | 218 | 52.65 | 51.56 | 50.04 | 56.70 |
| | 4.9% | 5.00 | 13.05 | 10.42 | 11.47 | 6.61 |
| | | | 16.28 | 19.23 | 18.63 | 16.88 |

TABLE 10-continued

| Paper ID | TMA Alpa Onset °C. % Expan | DSC Onset °C. Peak °C. J/G | TGA-Total %/Temp. °C. 1st Peak 2nd Peak 3rd Peak Residue | TGA-Top %/Temp. °C. 1st Peak 2nd Peak 3rd Peak Residue | TGA-Mid. %/Temp. °C. 1st Peak 2nd Peak 3rd Peak Residue | TGA-Bot. %/Temp. °C. 1st Peak 2nd Peak 3rd Peak Residue |
|---|---|---|---|---|---|---|
| Compar. 4 | 1300 | 186 | 18.87 | 19.62 | 18.20 | 18.63 |
|  | 108 | 236 | 56.26 | 62.25 | 56.63 | 58.85 |
|  | 8.9% | 5.04 | 13.10 | 5.74 | 11.80 | 9.53 |
|  |  |  | 12.79 | 13.65 | 14.43 | 15.61 |
| Ex. G | 525 | 190 | 17.99 | 18.38 | 18.42 | 17.79 |
|  | 73 | 205 | 55.88 | 55.27 | 54.37 | 57.41 |
|  | 4.6% | 1.51 | 11.65 | 10.89 | 11.44 | 8.16 |
|  |  |  | 15.07 | 15.91 | 16.34 | 16.47 |
| Ex. H | 558 | 190 | 19.48 | 19.28 | 20.33 | 19.79 |
|  | 84 | 205 | 52.17 | 51.30 | 51.04 | 53.28 |
|  | 4.2% | 2.51 | 12.34 | 13.06 | 11.88 | 9.49 |
|  |  |  | 16.76 | 17.03 | 17.40 | 18.03 |
| Ex. I | 672 | 205 | 19.62 | 19.09 | 19.64 | 18.57 |
|  | 86 | 225 | 53.66 | 56.25 | 52.21 | 52.19 |
|  | 5.2% | 0.11 | 11.65 | 8.41 | 11.81 | 13.80 |
|  |  |  | 16.02 | 16.36 | 16.80 | 15.08 |

Table 11 provides a summary of test procedure conditions for the high speed durability tests 5004C and 5004A, the breaking characteristic test 5004D, the high energy durability tests 5003A and 5030C, and the $\mu$-v-p-t characteristic test 5010A for the materials shown in Examples 18–23 below.

TABLE 11

| Test Procedure | High Speed Durability Test | | Break-in Characteristic |
|---|---|---|---|
|  | 5004C | 5004A | 5004D |
| Level | Level A & C | Level A & C | Level A |
| Cycles | 50 cycles | ← | 200 cycles |
| Speed | 3700 rpm | ← | ← |
| Inertia | 2.17 kg cm · sec² | ← | ← |
| Pressure | 137.8 KPa | ← | ← |
| Temperature | 100—100° C. | ← | ← |
| Oil flow | 0.757 lpm | ← | ← |
| Kinetic energy | 15122 Joule | ← | ← |
| Level | Level B | Level B | — |
| Cycles | 5000 cycles | 2000 cycles | — |
| Speed | 6200 rpm | ← | — |
| Inertia | 1.70 kg cm sec² | ← | — |
| Pressure | — | — | — |
| Stop Time | *0.8 sec. | ← | — |
| Temperature | 115–120° C. | 110—110° C. | — |
| Oil flow | 0.787 lpm | ← | — |
| Kinetic energy | 35720 Joule | ← | — |
| Power density | 1.98 W/mm² | ← | — |
|  | 5003C | 5030C | 5010A |
| Level | Level A & C | Level A & C | Level A |
| Cycles | 50 cycles | ← | 200 cycles |
| Speed | 3600 rpm | ← | 800 rpm |
| Inertia | 1.70 kg cm sec² | ← | 3.553 kg cm sec² |
| Pressure | 137.8 kPa | ← | 59.27 KPa |
| Temperature | 97–103° C. | ← | ← |
| Oil flow | 0.757 lpm | ← | ← |
| Kinetic energy | 15127 Joule | ← | 1223 Joule |
| Level | Level B | Level B | Level B |
| Cycles | 2000 cycles | 5000 cycles | 200 cycles |
| Speed | 3600 rpm | 4000 rpm | 3600 rpm |
| Inertia | 7.48 kg cm sec² | 5.00 kg cm sec² | 3.553 kg cm sec² |
| Pressure | — | — | 355.6 KPa |
| Stop Time | **0.8 sec. | ***0.95 sec. | — |
| Temperature | 97–103° C. | 115–120° C. | 97–103° C. |
| Oil flow | 0.787 lpm | ← | ← |
| Kinetic energy | 52124 Joule | 43016 Joule | 24761 Joule |
| Power density | 2.89 W/mm² | 2.01 W/mm² | — |

TABLE 11-continued

| Test Procedure | High Speed Durability Test | Break-in Characteristic |
|---|---|---|

Note:
*In level B, adjust apply pressure to maintain 0.8 seconds stop time within the first 10 cycles.
**In level B, adjust apply pressure to maintain 0.8 seconds stop time within the first 10 cycles.
***In level B, press start at 140 KPa, adjust the pressure to maintain 0.95 seconds stop time by 90th cycle.

EXAMPLE 18

In the Table 12 below, the high speed durability is shown for the Comparatives 3 and 4 and Examples G, H, I and J. The friction material was impregnated with an epoxy modified phenolic resin at about 37% pickup. The shear strength of the Examples G, H and I were comparable to Example J. The compression and compression set showing the strain shows acceptable strength and elasticity which allows for more uniform heat dissipation during use of the friction material since the fluid in the transmission or brake can rapidly move through the porous structure. The increased elasticity also provides more uniform pressure or even pressure distribution on the friction material such that uneven lining wear or separator plate "hot spots" are eliminated or minimized.

Table 13 below shows high speed durability testing showing the friction plate condition, separator plate condition and the overall condition of each sample. It is to be especially noted that Example I only had light glazing and pitting and the overall condition was fair with no material loss.

Table 14 below shows the high speed durability test showing the friction coefficient at energy levels A, B and C, the stop-time and the percent of fade. The Comparative 4, Example G and J experienced a break-out and the test was stopped. The fibrous base material in Examples H and I performed well at high speeds. It is important to note that there is no "fall off" of the coefficient of friction as the number of cycle increases for the fibrous base material in Example I.

TABLE 12

High Speed Durability Test
(Procedure 5004A)

| Material | Comp. 3 | Comp. 4 | Ex. G | Ex. H | Ex. I | Ex. J |
|---|---|---|---|---|---|---|
| Raw paper pore size ($\mu$m) | 25.86 | 26.29 | 5.46 | 6.00 | 7.84 | — |
| permeability (cm$^2$) | 0.516 | 0.653 | 0.077 | 0.115 | 0.127 | — |
| Resin 37% p/u pore size ($\mu$m) | 15.09 | 23.90 | 4.32 | 5.35 | 7.04 | 9.88 |
| permeability (cm$^2$) | 0.225 | 0.295 | 0.030 | 0.054 | 0.115 | — |
| Shear strength (psi) | 127.2 | 87.9 | 354.6 | 318.8 | 339.5 | 359.8 |
| 300 psi comp/set (strain) | 0.1222/ 0.0232 | 0.1448/ 0.0309 | 0.0475/ 0.0002 | 0.0528/ 0.0030 | 0.0546/ 0.0015 | 0.0698/ 0.0106 |
| 1500 psi comp/set (strain) | 0.2999/ 0.1049 | 0.2955/ 0.0821 | 0.1946/ 0.0510 | 0.1721/ 0.0414 | 0.2321/ 0.0482 | 0.1988/ 0.0362 |

TABLE 13

High Speed Durability Test
(Procedure 5004A)

| Friction Tests | Comp. 3 | Comp. 4 | Ex. G | Ex. H | Ex. I | Ex. J |
|---|---|---|---|---|---|---|
| Total wear (inch) | 0.0168 | impossible | impossible | 0.0269 | 0.0081 | impossible |
| Friction plate condition | light glazing & pitting | heavy material loss | heavy material loss | glazing pitting breakout | glazing light pitting | heavy material loss |
| Separator plate condition | dark heat stain | heat stain hot spots | heat stain | heat stain hot spots | heat stalight hot spots | heat stains |
| Overall condition | poor | not complete | not complete | fair | fair | poor |

TABLE 14

High Speed Durability Test
(Procedure 5004A)

| Friction Coefficients | Comp. 3 | Comp. 4 | Ex. G | Ex. H | Ex. I | Ex. J |
|---|---|---|---|---|---|---|
| Level A (50 cycles) | | | | | | |
| $\mu$s | 0.092 | 0.099 | 0.099 | 0.101 | 0.095 | 0.103 |
| $\mu$i | 0.153 | 0.173 | 0.141 | 0.152 | 0.129 | 0.161 |
| $\mu$d | 0.130 | 0.132 | 0.136 | 0.136 | 0.128 | 0.141 |
| $\mu$O | 0.141 | 0.134 | 0.149 | 0.147 | 0.133 | 0.145 |
| $\mu$O/$\mu$d | 1.085 | 1.015 | 1.095 | 1.081 | 1.039 | 1.028 |
| Level B (2050 cycles) | | | | | | |
| $\mu$s | 0.071 | 787 cycles | 592 cycles | 0.086 | 0.081 | 101 cycles |
| $\mu$i | 0.127 | break-out | break-out | 0.133 | 0.136 | break-out |
| $\mu$d | 0.127 | stop | stop | 0.124 | 0.126 | stop |
| $\mu$O | 0.122 | | | 0.128 | 0.124 | |
| $\mu$O/$\mu$d | 0.961 | | | 1.032 | 0.984 | |
| Level C (2100 cycles) | | | | | | |
| $\mu$s | 0.106 | — | — | 0.102 | 0.101 | — |
| $\mu$i | 0.163 | — | — | 0.161 | 0.160 | — |
| $\mu$d | 0.148 | — | — | 0.146 | 0.148 | — |
| $\mu$O | 0.149 | — | — | 0.141 | 0.149 | — |
| $\mu$O/$\mu$d | 1.007 | — | — | 0.966 | 1.007 | — |
| Stop-time (sec) | | | | | | |
| A | 0.916 | 0.917 | 0.917 | 0.891 | 0.958 | 0.855 |
| B | 0.803 | — | — | 0.814 | 0.792 | — |
| C | 0.805 | — | — | 0.856 | 0.835 | — |
| Fade % $\mu$d | −0.8 | — | — | −5.3 | −3.8 | — |
| stop time | +0.1 | — | — | −0.2 | +0.6 | — |

EXAMPLE 19

The high energy durability tests are shown in Tables 15, 16 and 17 below for the Comparatives 3 and 4 and Examples G, H, I and J impregnated with the epoxy modified phenolic resin. It is noted that the amount of resin pick-up varies for different examples. In Table 15, the compression and compression set data show acceptable values for the Examples G, H, I and J.

Table 16 shows the friction plate condition, the separator plate condition and the overall condition. It is to be noted that Example I showed only a slight abrasion, glazing and pitting and that the separator plate had few hot spots or heat strains.

Table 17 below shows the friction coefficient for levels A, B and C, the stop time and percent rate. As can be seen, the examples of the present invention perform consistently better than the comparative materials. Thus, the fibrous base materials of the present invention performed much better at higher speeds than the comparative materials. It is also important to note that there is no fall off of coefficient of friction as the number of cycles increases for the fibrous base materials of Example I. Also, the relatively steady coefficient of friction indicates the friction materials are very stable.

TABLE 15

High Energy Durability Test (Procedure 5003A)

| Material | Comp. 3 | Comp. 4 | Ex. G | Ex. H | Ex. I | Ex. J |
|---|---|---|---|---|---|---|
| Raw paper pore size ($\mu$m) | 25.86 | 26.29 | 5.46 | 6.00 | 7.84 | — |
| permeability (cm$^2$) | 0.516 | 0.653 | 0.077 | 0.115 | 0.127 | — |
| resin 37% p/u | 20.03 | 22.44 | 4.32 | 5.35 | 7.04 | 9.33 |
| pore size ($\mu$m) | (53.2% pu) | (54.9% pu) | (37% pu) | (35% pu) | (37% pu) | |
| permeability (cm$^2$) | — | — | 0.030 | 0.054 | 0.115 | — |
| Shear strength (psi) | 224.2 | 177.9 | 354.6 | 318.8 | 339.5 | 359.8 |
| 300 psi comp/set | 0.1016/ | 0.1563/ | 0.0475/ | 0.0528/ | 0.0546/ | 0.0698/ |
| (strain) | 0.0122 | 0.0323 | 0.0002 | 0.0030 | 0.0015 | 0.0106 |
| 1500 psi comp/set | 0.2886/ | 0.3746/ | 0.1946/ | 0.1721/ | 0.2321/ | 0.1988/ |
| (strain) | 0.0627 | 0.0934 | 0.0510 | 0.0414 | 0.0482 | 0.0362 |

TABLE 16

High Speed Durability Test (Procedure 5003A)

| Friction Tests | Comp. 3 | Comp. 4 | Ex. G | Ex. H | Ex. I | Ex. J |
|---|---|---|---|---|---|---|
| Total wear (inch) | 0.0205 | 0.0245 | impossible | 0.0242 | 0.0256 | 0.0192 |
| Friction plate condition | light glazing & pitting | glazing light pitting | heavy material loss | heavy glaze & abrasions breakout | glazing abrasion slight pitting | glazing abrasion |
| Separator plate condition | heat stain few hot spots | heat stain few hot spots | heat stain hot spots | mid wear mark & heat stains heavy abrasion | mid wear mark few hot spots heat stains | heat stained hot spots |
| Overall condition | fair 1 | fair 2 | not complete | poor | fair 2 | fair |

TABLE 17

High Energy Durability Test (Procedure 5003A)

| Friction Coefficients | Comp. 3 | Comp. 4 | Ex. G | Ex. H | Ex. I | Ex. J |
|---|---|---|---|---|---|---|
| Level A (50 cycles) | | | | | | |
| $\mu$s | 0.102 | 0.103 | 0.111 | 0.101 | 0.104 | 0.121 |
| $\mu$i | (0.141) | (0.240) | 0.145 | 0.148 | (0.137) | 0.146 |
| $\mu$d | 0.131 | 0.124 | 0.141 | 0.131 | 0.130 | 0.136 |
| $\mu$O | 0.142 | 0.136 | 0.145 | 0.143 | 0.140 | 0.149 |
| $\mu$O/$\mu$d | 1.084 | 1.097 | 1.028 | 1.091 | 1.077 | 1.096 |
| Level B (2050 cycles) | | | | | | |
| $\mu$s | 0.101 | 0.101 | 124 cycles | 0.093 | 0.103 | 0.097 |
| $\mu$i | 0.137 | 0.129 | break-out | 0.127 | 0.128 | 0.141 |
| $\mu$d | 0.137 | 0.129 | stop | 0.128 | 0.130 | 0.132 |
| $\mu$O | 0.142 | 0.123 | | 0.131 | 0.128 | 0.146 |

TABLE 17-continued

High Energy Durability Test
(Procedure 5003A)

| Friction Coefficients | Comp. 3 | Comp. 4 | Ex. G | Ex. H | Ex. I | Ex. J |
|---|---|---|---|---|---|---|
| µO/µd | 1.036 | 0.953 | | 1.023 | 0.985 | 0.106 |
| Level C (2100 cycles) | | | | | | |
| µs | 0.115 | 0.114 | — | 0.100 | 0.108 | 0.103 |
| µi | 0.174 | 0.160 | — | 0.152 | 0.154 | 0.173 |
| µd | 0.152 | 0.151 | — | 0.145 | 0.150 | 0.149 |
| µO | 0.152 | 0.155 | — | 0.142 | 0.150 | 0.144 |
| µO/µd | 1.000 | 1.026 | — | 0.979 | 1.000 | 0.966 |
| Stop-time (sec) | | | | | | |
| A | 0.867 | 0.913 | 0.863 | 0.878 | 0.888 | 0.840 |
| B | 0.756 | 0.778 | — | 0.816 | 0.807 | 0.773 |
| C | 0.800 | 0.812 | — | 0.841 | 0.843 | 0.830 |
| Fade % µd | +3.0 | −0.8 | — | −4.5 | −3.0 | −2.2 |
| stop time | −5.7 | −2.5 | — | +1.7 | +1.4 | −4.0 |

EXAMPLE 20

High energy durability tests were also conducted for Examples I and J using different resins and different percentages of resins. It is to be noted that the shear strengths vary slightly with the type of resin, but that the shear strengths are consistently acceptable. The compression and compression set data indicate a better performance by Example I over the Example J. The coefficient of friction levels, for example, I is impregnated with a phenolic resin which shows better results than the other tested examples. Again, there is no "fall off" shown for Example I in Table 18.

TABLE 18

High Energy Durability Test
(Procedure 5030A)

| | Ex. I | Ex. J | Ex. I | Ex. J |
|---|---|---|---|---|
| Resin | phenolic | phenolic | epoxy-modified phenolic | epoxy-modified phenolic |
| Pick-up | 35% | 36% | 39.7% | 40.7% |
| Shear psi | 340 | 356 | 254 | 301 |
| Comp/comp-set 300 psi/1500 psi | 0.050/0.006 0.147/0.016 | 0.053/0.008 0.192/0.036 | 0.066/0.015 0.217/0.047 | 0.059/0.008 0.220/0.049 |
| Total wear (in.) | 0.0106 | 0.0142 | — | — |
| Level A 50 cycles | | | | |
| µs | 0.094 | 0.097 | 0.095 | 0.109/0.092 |
| µi | 0.132 | 0.130 | 0.131 | 0.157/0.146 |
| µd | 0.132 | 0.132 | 0.121 | 0.129/0.120 |
| µO | 0.140 | 0.136 | 0.133 | 0.144/0.136 |
| Level B 5050 cycles | | | | |
| µs | 0.077 | Stopped test at 3378 cycles Stop-time 1.244 sec. | Failed at 110 cycles | Failed at 100 & 125 cycles |
| µi | 0.102 | | | |
| µd | 0.101 | | | |
| µO | 0.113 | | | |
| Level C 5100 cycles | | | | |
| µs | 0.103 | — | — | — |
| µi | 0.147 | — | — | — |
| µd | 0.120 | — | — | — |
| µO | 0.139 | — | — | — |
| Stop-time (sec.) | | | | |
| A | 0.825 | 0.861 | 0.916 | 08.54/0.927 |
| B | 1.109 | — | — | — |
| C | 0.923 | — | — | — |
| Stop-time Fade 15% cycles | 4000 cycles | 2100 cycles | — | — |

In the Examples 21–23 below, each of the following fibrous base materials is a formulation which comprises, in percent, by weight, about 23% synthetic graphite, about 27% diatomaceous earth, about 5% aramid fiber pulp and varying types of fibers:

- Example K about 45% aramid fibers—(CSF between 580–640);
- Example L about 45% aramid fibers—(CSF between about 450–500);
- Example M about 45% aramid fibers—(CSF between about 580–640);
- Example N about 45% aramid fibers—(CSF between about 450–500); and
- Example O about 45% aramid fibers—(CSF between about 580–640).

EXAMPLE 21

Examples K and L shown in Table 19 below were saturated with about 48% and 46%, pick-up, respectively, with a resin blend of 50% silicone and about 50% phenolic resin. The shear strength and the compression and compression set data show that Example K comprising the less fibrillated aramid fibers (CSF 580–640) is comparable to Example L. The TGA, DSC and TMA data for Example K show high friction stability and good heat resistance.

Figure 23:
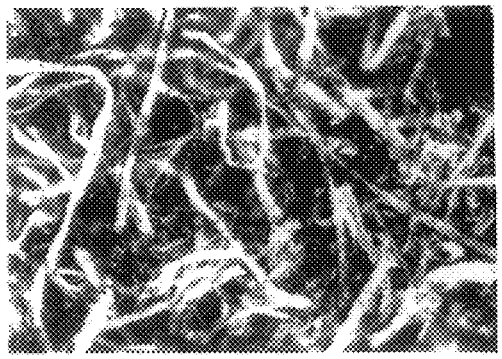
FIG. 23 is a scanning electron microphotograph of a fibrous base material comprising about 45% less fibrillated aramid fibers (CSF about 450–500), about 23% synthetic graphite, about 27% diatomaceous earth, and about 5% aramid fiber pulp (Example L).
Figure 24:
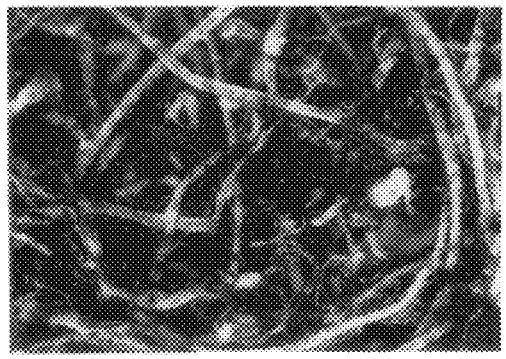
FIG. 24 is a scanning electron microphotograph of a fibrous base material comprising about 45% less fibrillated aramid fibers (CSF about 580–640), about 23% synthetic graphite, about 27% diatomaceous earth and about 5% aramid fiber pulp (Example K).

FIG. 23 shows the pore size of Example L, while FIG. 24 shows the pore size for Example K.

TABLE 19

|  | Ex. K | Ex. L |
| --- | --- | --- |
| Resin % PU | 48% PU | 46% PU |
| Raw paper pore size (μm) | 6.00 | 6.28 |
| Graphite concentration Felt/wire (%) | 1.3/2.8 | 2.4/5.1 |
| Saturated paper pore size (μm) | 5.99 | 5.20 |
| shear strength (psi) | 313 | 422 |
| (Comp/Comp-set (strain) 300/1500 psi | 0.074/0.016 0.210/0.042 | 0.059/0.008 0.172/0.027 |
| TGA | 21.78% | 22.08% |
| Residue Peak Temp. | 581.7° C. | 597.8° C. |
| DSC | 247.44 | 243.02 |
| Peak ° C. J/g | 27.68 | 26.38 |
| TMA | 561 | 439 |
| α Peak ° C. | 292 | 276 |

EXAMPLE 22

The high speed durability test under Procedure 5004C for Examples K, L, M and N are shown in Tables 20 and 21 below. The friction plate condition showed only medium to light glaze and the separator plate condition showed medium heat stains for the fibrous base material containing less fibrillated aramid fibers (CSF about 580–640). The coefficient of friction for levels A, B and C indicate that the fibrous base materials perform consistently. The stop time and percent fade was about 3 to 4 times better for Exhibit K than for Exhibit L. The stop time for Exhibit M was at least about 4 times better than for Exhibit N, and the percent fade was more than two times better for Exhibit M than for Exhibit N.

TABLE 20

High Speed Durability Test (Procedure 5004C)

|  | Ex. K | Ex. L |
| --- | --- | --- |
| Resin | 48% PU | 46% PU |
| Total wear (in.) | 0.0056 | 0.0068 |
| Friction plate condition | Medium glaze | Light to Medium glaze |
| Separator plate condition | Medium heat stains | Medium to heavy heat stains |
| Level A 50 cycles |  |  |
| μS | 0.095 | 0.104 |
| μi | 0.135 | (0.146) |
| μd | 0.119 | 0.129 |
| μO | 0.123 | 0.132 |
| Level B 5050 cycles |  |  |
| μS | 0.095 | 0.094 |
| μi | 0.116 | 0.110 |
| μd | 0.115 | 0.112 |
| μO | 0.122 | 0.121 |
| Level C 5100 cycles |  |  |
| μS | 0.115 | 0.113 |
| μi | 0.137 | 0.134 |
| μd | 0.122 | 0.116 |
| μO | 0.129 | 0.123 |
| Stop-time (sec.) |  |  |
| A | 0.946 | 0.885 |
| B | 0.827 | 0.914 |
| C | 0.932 | 0.957 |
| Stop-time fade | 3.5% | 12.8% |
| μd fade (%) | 5.7% | 14.5% |

TABLE 21

High Speed Durability Test (Procedure 5004C)

|  | Ex. M | Ex. N |
| --- | --- | --- |
| Resin | 41% PU | 42% PU |
| Total wear (in.) | 0.0077 | 0.0069 |
| Friction plate condition | Medium glaze | Medium glazing & abrasion |
| Separator plate condition | Medium heat stains hot spots, light abrasion | Medium heat stains hot spots |
| Level A 50 cycles |  |  |
| μS | 0.095 | 0.095 |
| μi | 0.148 | 0.153 |
| μd | 0.118 | 0.119 |
| μO | 0.121 | 0.123 |
| Level B 5050 cycles |  |  |
| μS | 0.086 | 0.084 |
| μi | 0.112 | 0.113 |
| μd | 0.110 | 0.112 |
| μO | 0.119 | 0.118 |
| Level C 5100 cycles |  |  |
| μS | 0.109 | 0.105 |
| μi | 0.145 | 0.143 |
| μd | 0.119 | 0.122 |
| μO | 0.126 | 0.126 |

TABLE 21-continued

High Speed Durability Test
(Procedure 5004C)

|  | Ex. M | Ex. N |
|---|---|---|
| Stop-time (sec.) | | |
| A | 0.965 | 0.922 |
| B | 0.829 | 0.881 |
| C | 0.938 | 0.924 |
| Stop-time fade | 1.6% | 7.6% |
| μd fade (%) | 5.2% | 11.8% |

EXAMPLE 23

The break-in characteristics are shown in Table 22 below for Examples K, L and O. The break-in characteristics indicate good behavioral characteristics and low wear.

TABLE 22

Break-In Characteristic Test
(Procedure 5004D)

| | 48% PU | | 46% PU |
|---|---|---|---|
| | | Type of Fiber | |
| | Ex. K | Ex. O | Ex. L |
| 1 cycles | | | |
| μS | 0.092 | 0.104 | 0.117 |
| μi | 0.106 | 0.117 | 0.127 |
| μd | 0.092 | 0.108 | 0.114 |
| μO | 0.096 | 0.103 | 0.111 |
| 50 cycles | | | |
| μS | 0.102 | 0.098 | 0.099 |
| μi | 0.143 | 0.142 | 0.161 |
| μd | 0.116 | 0.115 | 0.133 |
| μO | 0.121 | 0.118 | 0.131 |
| 200 cycles | | | |
| μS | 0.097 | 0.097 | 0.105 |
| μi | 0.146 | 0.145 | 0.160 |
| μd | 0.123 | 0.123 | 0.142 |
| μO | 0.128 | 0.122 | 0.139 |
| Stop-time (sec.) | | | |
| 1 | 1.104 | 1.093 | 1.015 |
| 50 | 0.962 | 0.988 | 0.868 |
| 200 | 0.919 | 0.946 | 0.828 |
| Total Wear (in.) | 0.0011 | 0.001 | 0.0012 |

The Examples 15–23 show that increase in Canadian Standard Freeness of aramid type fibers produces fibrous base materials having improved durability. Further, fibrous base materials containing aramid fibers having a CSF of at least about 580–640, and preferably about 600–640 and most preferably about 620–640, have larger pore sizes than other types of aramid fibers. The high inertia durability of the fibrous base materials having such less fibrillated aramid fibers is improved and there is a better fade resistance.

In another aspect of the present invention, friction materials comprising a two layer fibrous base material and impregnated with a suitable phenolic, epoxy modified phenolic, or phenolic/silicone blend resin provides superior friction performance and better break-in characteristics than friction materials containing conventional materials. The fibrous base material comprises a primary layer of a less fibrillated aramid fiber, synthetic graphite, filler materials such as diatomaceous earth, and in certain embodiments, cotton and/or aramid pulp and other optional ingredients. The secondary layer comprises a deposit of carbon particles on the surface of the fibrous material during the fibrous base material making process.

The adhesion of the carbon particles on the surface of the fibrous base material can be improved by using retention aids and/or binding agents such as a suitable amount of latex type materials present in the primary or lower layer. In certain embodiments, it has been found useful to have about 1 to about 5% and preferably about 2%, by weight, of the latex binding agent present in the primary layer.

The uniformity of the layer of carbon particles on the surface of fibrous base materials can also be improved using a range and size of the carbon particles that is preferably from about 0.5 to about 80 μm. However, it is contemplated that other sizes of carbon particles are also useful as a secondary layer on the fibrous base material of the present invention.

Figure 42:
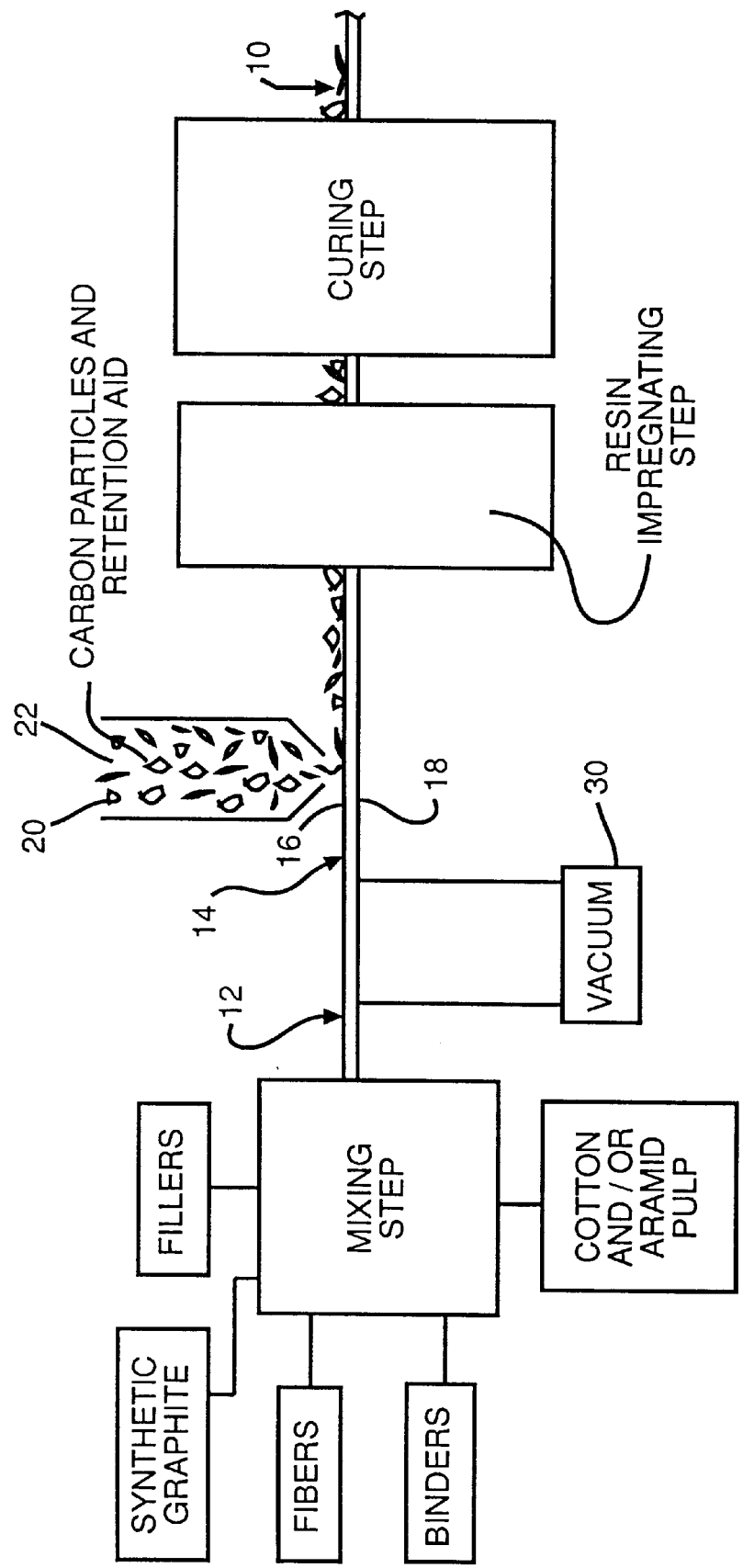
FIG. 42 is a schematic diagram showing one method for making a friction material according to the present invention.

One preferred embodiment for making a friction material 10 using a carbon coated fibrous 12 base material of the present invention is shown in FIG. 42. The fibrous base material 12 comprises a lower layer 14 having an upper or top surface 16 and a lower or bottom surface 18. In a preferred embodiment the lower layer 14 comprises the less fibrillated aramid fiber, synthetic graphite, filler material, optionally cotton and/or aramid pulp. While the lower layer 14 is wet, carbon particles 20 are deposited onto the top surface 16 of the wet lower layer 14. In certain embodiments, the lower layer 14 further comprises a suitable amount of at least one type of binder material such that the carbon particles are adhered to the wet layer 14 by the binder material which is present in the lower wet layer 14. Suitable binder materials include, for example a latex type binder material and/or an alum based material having a pH of about 4.5 or less.

In yet another preferred embodiment, the carbon particles 20 and retention aid 22 are mixed together and dispersed or deposited onto the top surface 16 of the lower layer 14.

In another embodiment it is also useful to use a low vacuum pressure means 30 on a lower side of the wet layer 14 prior to deposition of the carbon particles 20 and retention aid 22 on the opposing bottom surface 18 of the layer 14.

In a preferred embodiments the amount of carbon particles range from about 0.2 to about 20%, by weight, and in certain embodiments about 15 to about 5%, by weight, and in other embodiments about 2 to about 20%, by weight, of the friction paper. In preferred embodiments the area of coverage of carbon particles on the primary layer surface is in the range of the about 3 to about 90% of the surface area.

A preferred process for producing the non-asbestos friction material comprises mixing less fibrillated aramid fibers with synthetic graphite and at least one filler to form a fibrous base material. At least one surface of the fibrous base material is coated with the carbon particles and retention aid. The fibrous base material coated with the carbon particles and retention aid is impregnated with at least one phenolic or modified phenolic resin. The impregnated, coated fibrous base material is cured at a predetermined temperature for a predetermined period of time.

In another embodiment a phenolic resin can be mixed with a silicone resin to impregnate the fibrous base material, as disclosed in co-pending patent application Ser. No. 08/126,000, filed Sep. 23, 1993 now abandoned. The entire contents of which are expressly incorporated by reference herein.

It has been found that the longer fiber length, together with the high Canadian freeness and layer of carbon particles provides a friction material which provides high durability, good wear resistance and improved break-in characteristics. As shown in the examples below, the change in the coefficient of friction of the carbon deposit layered friction material in the initial stages is much less than friction materials with no carbon deposit.

Table 23 provides a summary of test procedure conditions for break-in characteristics test 5004DN, high speed durability tests 5004CN, high energy durability tests 5030CN and the $\mu$-v-p-t characteristic test 491N–494N for the materials shown in Examples 24–28 below.

TABLE 23

Test Procedure Conditions (Not Immersed Modification) (Size 3 Plates)

| Test Procedure | Break-in Characteristics 5004DN | High Energy Durability Test 5004CN | High Energy Durability Test 5030CN |
|---|---|---|---|
| Level | Level A | Level A & C | Level A & C |
| Cycles | 200 cycles | 50 cycles | ← |
| Speed | 3700 rpm | ← | 3600 rpm |
| Inertia | 2.17 kgcmsec$^2$ | ← | ← |
| Pressure | 137.8 KPa | ← | ← |
| Temperature | 100–110° C. | ← | ← |
| Oil flow | 0.757 lpm | ← | ← |
| Kinetic energy | 15974 Joule | ← | 15122 Joule |
| Level | — | Level B | Level B |
| Cycles | — | 5000 cycles | 5000 cycles |
| Speed | — | 6200 rpm | 4000 rpm |
| Inertia | — | 1.98 kgcmsec$^2$ | 5.30 kgcmsec$^2$ |
| Pressure | — | — | — |
| Stop Time | — | *0.8 sec. | **0.95 sec. |
| Temperature | — | 110–110° C. | 100–110° C. |
| Oil flow | — | 0.787 lpm | ← |
| Kinetic energy | — | 40865 Joule | 45558 Joule |
| Power density | — | 2.27 W/mm$^2$ | 2.13 W/mm$^2$ |

| Test Procedures | $\mu$-v-p-t Characteristics 491N–494N | |
|---|---|---|
| Level | Level A | Level B |
| Cycles | 50 cycles | 25 cycles |
| Speed | 800 rpm | 1400 rpm |
| Inertia | 3.55 kgcmsec$^2$ | ← |
| Pressure | 48.7 KPa | 97.4 KPa |
| Temperature | 491N = 30° C.,492N = 80° C. | ← |
|  | 493N = 100° C.,494N = 120° C. | ← |
| Oil flow | 0.757 lpm | ← |
| Kinetic energy | 1223 Joule | 3745 Joule |
| Level | Level C | Level D |
| Cycles | 25 cycles | 25 cycles |
| Speed | 2600 rpm | 3600 rpm |
| Inertia | 3.55 kgcmsec$^2$ | 3.55 kgcmsec$^2$ |
| Pressure | 194.8 KPa | 292.2 KPa |
| Stop Time | — | — |
| Temperature | 491N = 30° C.,492N = 80° C. | 491N = 30° C.,492N = 80° C. |
|  | 493N = 100° C.,494N = 120° C. | 493N = 100° C.,494N = 120° C. |
| Oil flow | 0.787 lpm | ← |
| Kinetic energy | 12916 Joule | 24761 Joule |
| Power density | — | — |

Note:
*In level B, adjust apply pressure to maintain 0.8 seconds stop time within 175th cycles.
**In level B, press start at 140 KPa, adjust the pressure to maintain 0.95 seconds stop time by 175th cycles.

EXAMPLE 24

The following fibrous base materials, in percent, by weight, are used in the examples below.

Example P is a two layer fibrous base material comprising a primary layer of about 45% fibrillated aramid fibers (CSF about 450–500), about 10% synthetic graphite, about 40% diatomaceous earth, and optionally about 5% optional filler, such as aramid pulp, and a secondary layer of about 3–5% carbon particles. In certain embodiments, it is desirable to use a retention aid to help adhere the carbon particles on the surface of the fibrous base material.

Example Q is a two layer fibrous base material comprising a primary layer of about 45% fibrillated aramid fibers (CSF about 450–500), about 23% synthetic graphite, about 27% diatomaceous earth, and optionally about 5% optionally filler such as aramid pulp, and a second layer of about 3–5% carbon particles.

Example R is a two layer fibrous base material comprising a primary layer of about 25% less fibrillated aramid fibers (CSF about 450–500), about 45% carbon particles and about 30% cotton fibers, and a secondary layer of about 20% carbon particles. In certain embodiments, it is desirable to use a retention aid up to about 20% Alum to a pH4.5 to help adhere the carbon particles on the surface of the fibrous base material.

Table 24 below shows results of a break-in test using a phenolic resin, for each of the fibrous base materials shown in Examples P, Q and R and the percent resin pick-up for each fibrous base material is as shown.

Table 25 below shows the break-in characteristics for the fibrous base materials for Examples P, Q and R saturated with a silicone resin B, wherein each fibrous base material has a percent resin pick-up as shown.

TABLE 24

Break-In Test

| Pick-Up | 39% Ex. P | 40% Ex. Q | 41% Ex. R |
|---|---|---|---|
| $\mu$(mid) | | | |
| cycle 1 | 0.107 | 0.101 | 0.132 |
| cycle 50 | 0.12 | 0.12 | 0.122 |
| cycle 100 | 0.121 | 0.12 | 0.116 |
| cycle 200 | 0.126 | 0.128 | 0.119 |
| % change | 17.76 | 26.73 | -9.85 |

TABLE 25

Break-In Test

| Raw Paper Pick-Up | Ex. P 61% | Ex. Q 60% | Ex. R 65% |
|---|---|---|---|
| Cure Condition | silicone resin B | silicone resin B | silicone resin B |
| $\mu$(mid) | | | |
| cycle 1 | 0.156 | 0.146 | 0.144 |
| cycle 50 | 0.162 | 0.154 | 0.137 |
| cycle 100 | 0.157 | 0.157 | 0.145 |
| cycle 200 | 0.162 | 0.153 | 0.142 |
| % change | 3.85 | 4.79 | -1.39 |
| Stop time | | | |
| cycle 1 | 0.79 | 0.821 | 0.808 |
| cycle 50 | 0.738 | 0.752 | 0.826 |

TABLE 25-continued

| | Break-In Test | | |
|---|---|---|---|
| Raw Paper Pick-Up | Ex. P 61% | Ex. Q 60% | Ex. R 65% |
| cycle 100 | 0.745 | 0.748 | 0.816 |
| cycle 200 | 0.749 | 0.748 | 0.807 |
| % change | −5.19 | −8.89 | −0.12 |

It is noted that for the high carbon particles deposit fibrous base materials (Example R) saturated with phenolic resin and non-phenolic resin, the dynamic coefficient of friction value and the stop time did not change after the 200 cycles test.

For papers with the low percentage of carbon particle content on the fibrous base material (Examples P and Q), the silicone resins help stabilize the dynamic coefficient of friction values within 20 cycles. In data not shown, it took 60 cycles for a phenolic/silicone resin to stabilize and about 80 cycles for a phenolic resin and 100 cycles for the phenolic resin system to stabilize.

The stop time became constant after 20 cycles for the pure silicone resins, while it took 80 cycles to reach the constant stop time for the silicone blend (data not shown). The phenolic resin examples shown in Table 24 needed about 100 cycles to level of stop time.

In certain embodiments, the break-in behavior depends on the degree of carbon coverage on the surface of the fibrous base material and on the compositions of the primary layer formulation (in various embodiments, sometimes the resin type is also to be considered in controlling the break-in behavior).

EXAMPLE 25

The following fibrous base materials, in percent by weight, are used in the examples below. Each example comprises about 20% less fibrillated aramid fibers (CSF about 580–640), about 20% synthetic graphite, about 20% diatomaceous earth, about 35% cotton fibers, and optionally about 2% latex. A secondary layer for each of the following examples comprised various percentage by weight of carbon particles.

Example S-0% carbon particles;

Example T-5% carbon particles;

Example U-10% carbon particles;

Example V-15% particles; and

Example W-20% carbon particles.

Table 26 provides break-in test data for Examples S, T, U, V and W saturated with a phenolic resin and cured at 350° F. for 30 minutes. The coefficient of friction for the mid, initial, final coefficients of friction are shown. Also, the stop time is shown. Table 27 also shows the surface carbon coverage as percent of area and the saturated paper pore size and liquid permeability. The higher mean flow pore diameter indicates that the friction material is more likely to have lower interface temperature because of more efficient dissipation in their transmission due to better automatic transmission fluid flow of materials out the porous structure of the friction material. Therefore, when a friction material initially starts with larger pores, more open pores remain during the useful life of the friction material.

TABLE 26

Break-In Test
(Procedure 5004D)

| Coverage (% By Weight) Resin Cure Condition | Ex. S 0%, phenolic 350° F./30 min | Ex. T 5%, phenolic 350° F./30 min | Ex. U 10%, phenolic 350° F./30 min | Ex. V 15%, phenolic 350° F./min | Ex. W 20%, phenolic 350° F./30 min |
|---|---|---|---|---|---|
| $\mu$ (mid) | | | | | |
| cycle 1 | 0.108 | 0.122 | 0.125 | 0.130 | 0.129 |
| cycle 50 | 0.121 | 0.124 | 0.118 | 0.119 | 0.109 |
| cycle 200 | 0.127 | 0.127 | 0.125 | 0.125 | 0.110 |
| % change | 17.6 | 4.1 | 0.0 | −3.8 | −14.7 |
| $\mu$ (initial) | | | | | |
| cycle 1 | 0.130 | 0.140 | 0.143 | 0.137 | 0.144 |
| cycle 50 | 0.153 | 0.140 | 0.133 | 0.131 | 0.128 |
| cycle 200 | 0.154 | 0.145 | 0.149 | 0.138 | 0.122 |
| % change | 18.5 | 3.6 | 4.2 | 0.7 | −15.3 |
| $\mu$ (final) | | | | | |
| cycle 1 | 0.109 | 0.124 | 0.130 | 0.130 | 0.133 |
| cycle 50 | 0.122 | 0.127 | 0.123 | 0.122 | 0.118 |
| cycle 200 | 0.133 | 0.130 | 0.123 | 0.129 | 0.114 |
| % change | 22.0 | 4.8 | −5.4 | −0.8 | −14.3 |
| stop time | | | | | |
| cycle 1 | 1.078 | 0.963 | 0.954 | 0.939 | 0.925 |
| cycle 50 | 0.903 | 0.889 | 0.911 | 0.917 | 0.956 |
| cycle 200 | 0.861 | 0.863 | 0.899 | 0.898 | 0.962 |
| % change | −20.1 | −10.4 | −5.8 | −4.4 | 4.0 |
| Sat. paper pore size ($\mu$m) | 8.31 | 6.13 | 7.10 | 7.16 | 7.72 |
| Liquid permeability (cm$^2$) | 0.127 | 0.111 | | 0.085 | 0.080 |
| Surface carbon coverage (area %) | 2.0% | 25.0% | 35.0% | 49.0% | 90.0% |

Table 27 shows the shear strength for Examples T, U, V and W. The higher the shear strength, the better the mechanical strength the friction material has, which means that more pressure is needed to shear the friction lining.

The shear strength friction materials of the present invention are greater than those for conventional materials. The use of the less fibrillated fibers and the resulting porous structure of the friction material provides increased thermal resistance of the friction material. The fiber geometry not only increases thermal resistance, but also provides delamination resistance and squeal resistance. In addition, the presence of the synthetic graphite particles and at least one filler material aids in increasing the thermal resistance, maintaining a steady coefficient of friction and increasing the squeal resistance. In addition, the average pore size for the friction material of the present invention ranges from about 0.5 μm to about 120 μm in diameter and in certain embodiments about 6, μm to about 50 μm in a preferred embodiment.

Table 27 also shows the compression/relaxation studies. These tests report the effect on paper caliber caused by repeatedly pressing on a sample and releasing the sample through a series of different pressures. These readings provide an indication of the internal resistance to set or compacting during the processing. The examples show good elasticity which allows for more uniform heat dissipation during use of the friction materials, since the fluid in the transmission or brake can rapidly move through the porous structure. Further, the increase elasticity provides more uniform pressure or even pressure distribution on the friction material, such that uneven lining wear or separator plate "hot spots" are eliminated or minimized.

TABLE 27

| | 2 Ply Carbon Materials | | | | |
|---|---|---|---|---|---|
| Trial # | Ex. S | Ex. T | Ex. U | Ex. V | Ex. W |
| Shear psi | 357 | 351 | 292 | 337 | 199 |
| Comp-set | 0.067/ 0.013 | 0.068/ 0.014 | 0.078/ 0.011 | 0.067/ 0.014 | 0.061/ 0.014 |
| 300/1500 psi | 0.201/ 0.041 | 0.197/ 0.038 | 0.212/ 0.040 | 0.210/ 0.049 | 0.237/ 0.068 |

Referring now to FIGS. 25–30, surface profiles for separator plates are shown. FIG. 25 shows a new separator plate having a surface roughness of about Ra 6.0 μ in.

FIG. 26 shows Example S having 0% carbon material tested, having an Ra of about 7.6 μ in.

FIG. 27 shows Example T having about 5% carbon material tested, having an Ra of about 6.0 μ in.

FIG. 28 shows Example U having about 10% carbon material, having an Ra of about 5.6 μ in.

FIG. 29 shows Example V having about 15% carbon material, having an Ra of about 11.5 μ in. with a scar depicted thereon.

FIG. 30 shows Example W having about 20% carbon material, having an Ra of about 11.7 μ in., having two scars shown thereon.

Table 28 shows the percent of area carbon for Examples S, T, U, V and W before the tests and after the tests.

TABLE 28

| Area % of Carbon | Ex. S | Ex. T | Ex. U | Ex. V | Ex. W |
|---|---|---|---|---|---|
| Before Test | 5% | 35% | 52% | 61% | 73% |
| After Test | 3% | 52% | 65% | 67% | 80% |

The above data in Tables 26 and 27 and in FIGS. 25–30 show a series of fibrous base materials with different percentage of carbon coverage on the surface which were tested for break-in behavior. It is to be noted that Examples T and U having a 5% and 10% carbon coverage, by weight, have a better break-in behavior than Example S having 0% carbon coverage. Both Examples T and U have similar mid point dynamic coefficient of frictions as Example S at cycle 200.

The Example W, having about 20% carbon coverage, had a large drop off of the dynamic coefficient and also a lower dynamic coefficient of friction than Example S having 0% carbon coverage at cycle 200.

Figure 31:
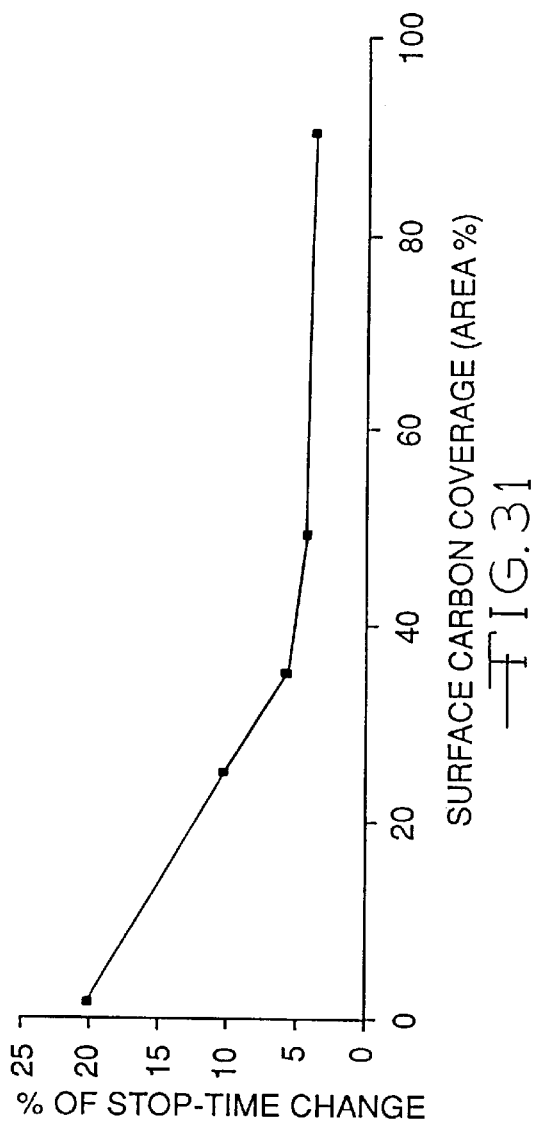
FIG. 31 is a graph showing the percent of stop time change versus the surface carbon coverage (area of percent) for Examples S, T, U, V and W, respectively.
Figure 32:
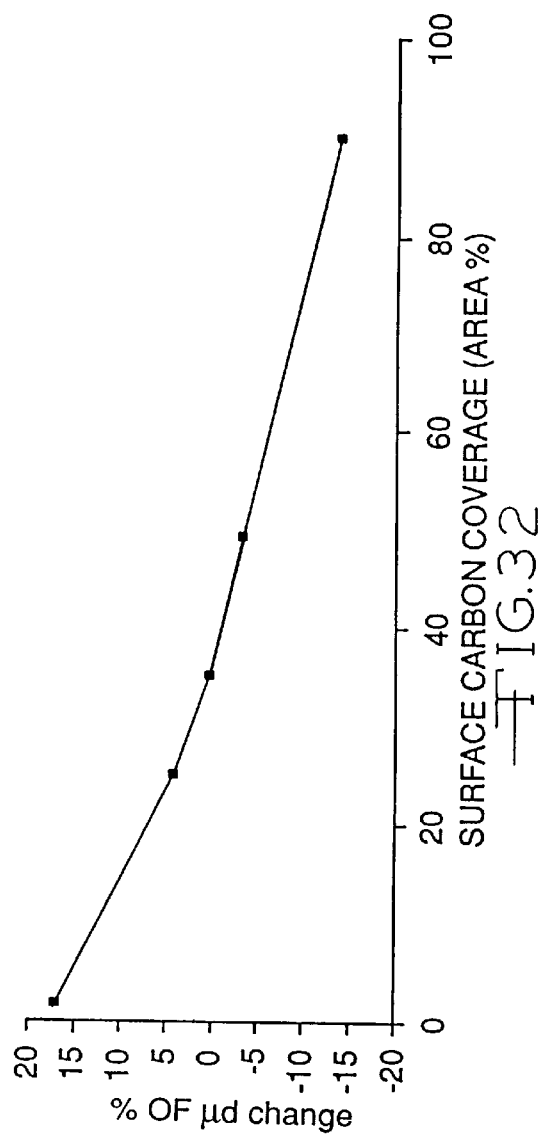
FIG. 32 is a graph showing the percent of $\mu d$ change versus surface carbon coverage (area of percent) for Examples S, T, U, V and W.

It is to be noted that there is a relationship between the percentage of dynamic coefficient of friction change and the surface carbon coverage (area of percent). There is also a relationship between the percent stop time change and the surface carbon coverage (area of percent). These relationships are shown in FIGS. 31 and: 32.

EXAMPLE 26

Example 26 shows the effect of carbon coverage on fibrous base materials in long-term durability tests. Example X comprises about 25% aramid fibers (CSF about 450–500), about 30% cotton fibers, about 20% synthetic graphite and about 25% diatomaceous earth.

Example Y comprises about 25% aramid fibers (CSF about 580–640), 20–30% cotton fibers, about 20–25% synthetic graphite and about 20–25% diatomaceous earth. Example T is as stated above and Example Z, comprises about 40–50% aramid fibers (CSF about 450–500), about 20–25% synthetic graphite, about 25–30% diatomaceous earth, and optionally about 0–7% aramid pulp.

The Example T resin has very good break-in behavior and the very good high speed durability. It should be noted that Example Y also had a better durability than the Example X even though neither Example Y nor X had carbon particles.

Figure 33:
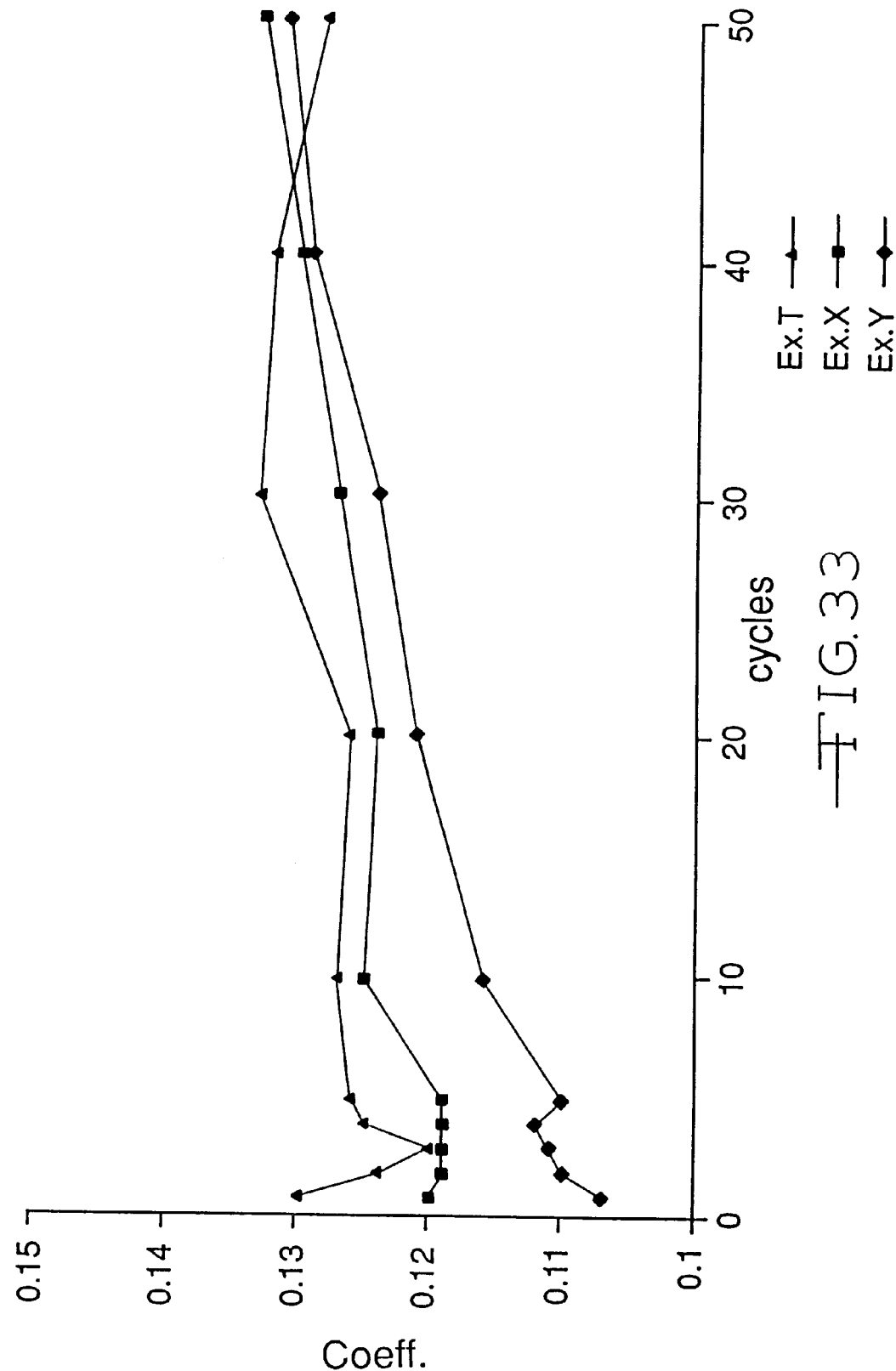
FIG. 33 is a graph showing the initial coefficient of friction change as the cycles increase for Examples X, T and Y.
Figure 34:
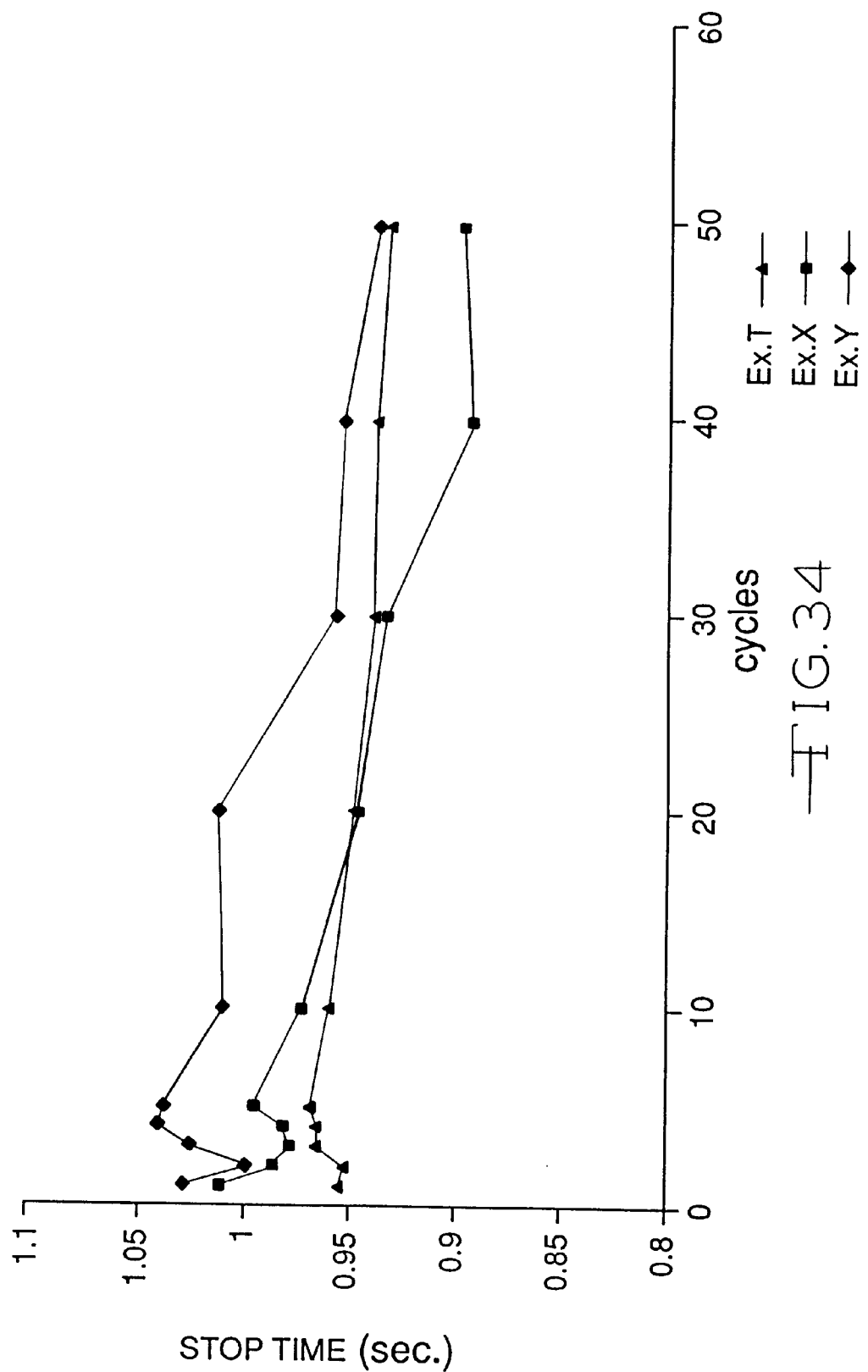
FIG. 34 is a graph showing the initial stop time in second versus cycles for Examples X, T and Y.

FIG. 33 shows the initial coefficient of friction change for Examples X, T and Y. FIG. 34 shows the initial stop time change for Examples X, T and Y.

EXAMPLE 27

Figure 35:
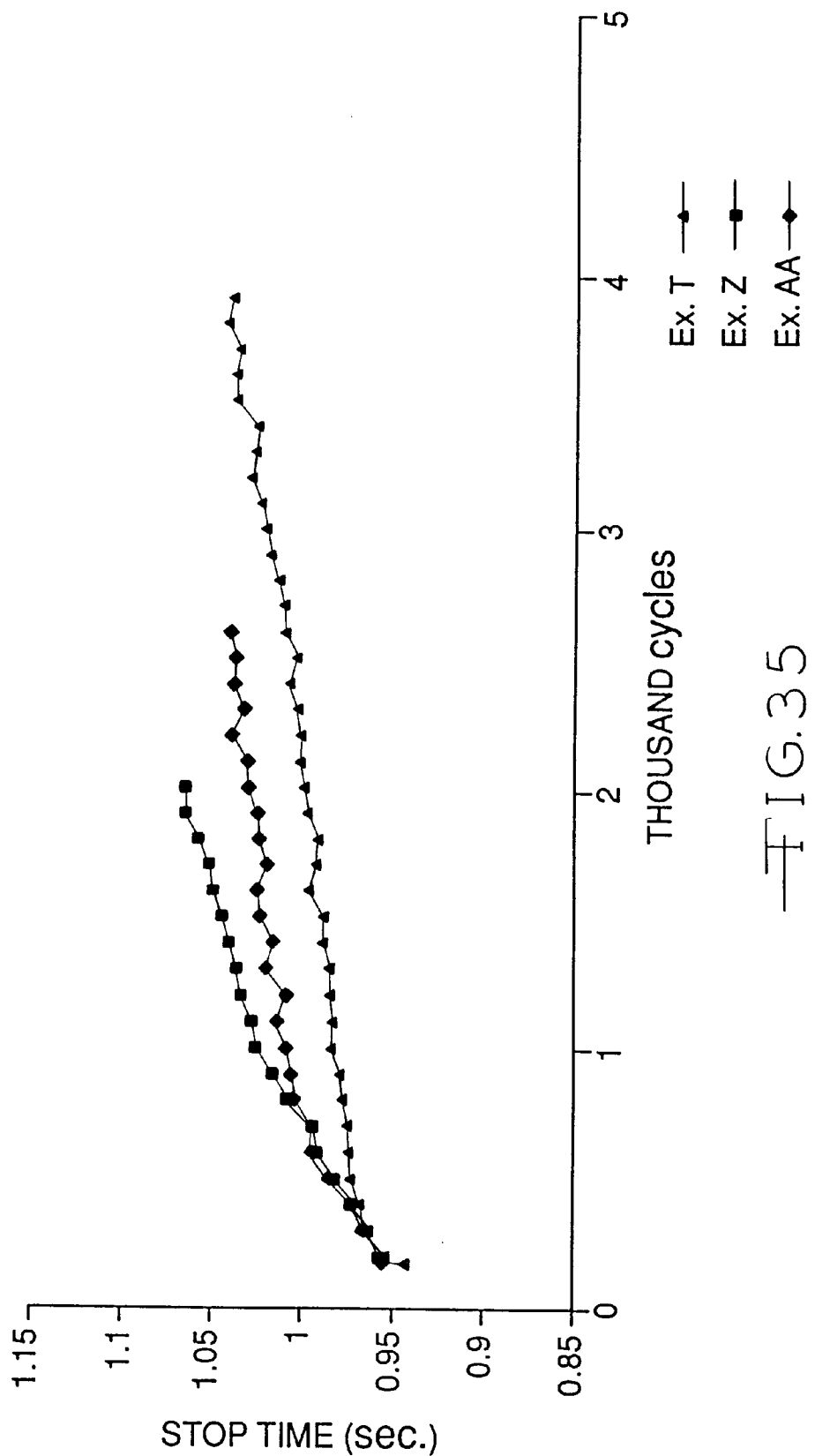
FIG. 35 is a graph showing a high energy durability test showing the stop time face for thousands of cycles for Examples Z, T and AA.

The high energy durability test according to Procedure 5030CN are shown in FIG. 35.

FIG. 35 shows the stop time fade for Examples T, Z and AA. It is noted that the Example T had a stop time fade at almost 4000 cycles, while the Example AA had a stop time fade of greater than 2500 cycles and that the stop time was less than about 1.05 seconds. It is seen in Example T that it has the best durability of all materials tested under this 5030CN procedure showing high inertia durability. Example T is the carbon deposit material (5% carbon deposition). Example AA and Z are non-carbon deposit materials (0% carbon deposit).

EXAMPLE 28

As seen in Table 29 below, the Example T which has about 5% carbon particle secondary layer shows good friction behavior, including good curve shape ratings and good coefficients of frictions as compared with Examples X and Y.

Figure 36:
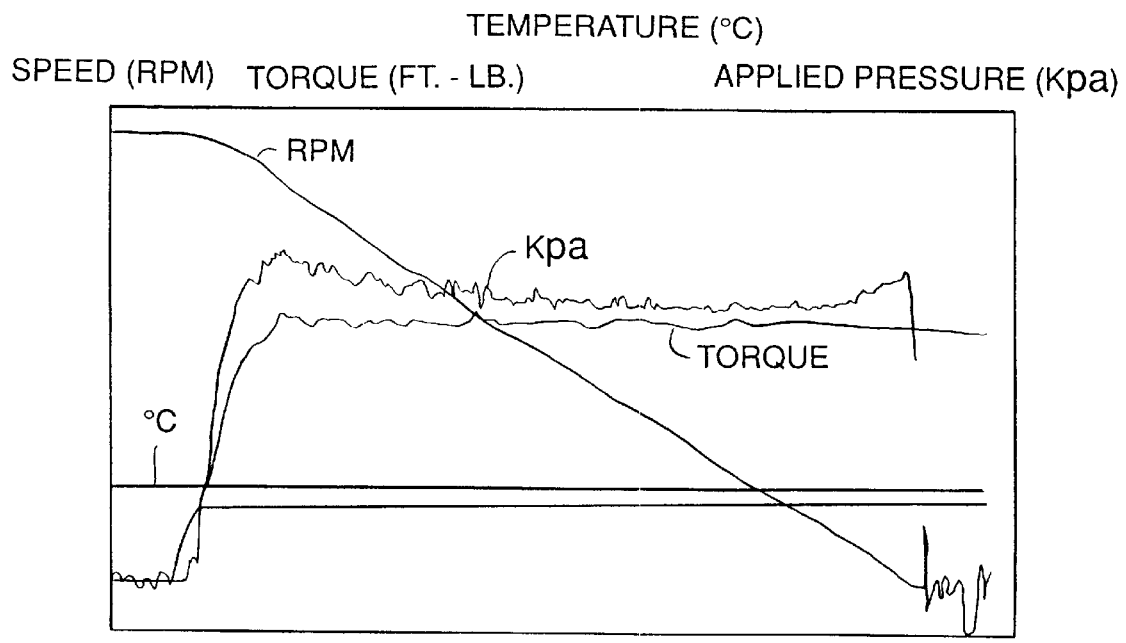
FIG. 36 is a graph showing the curve shape for Example X impregnated with a phenolic resin at 35% to 40% pick-up at level B at 70 cycles.
Figure 37:
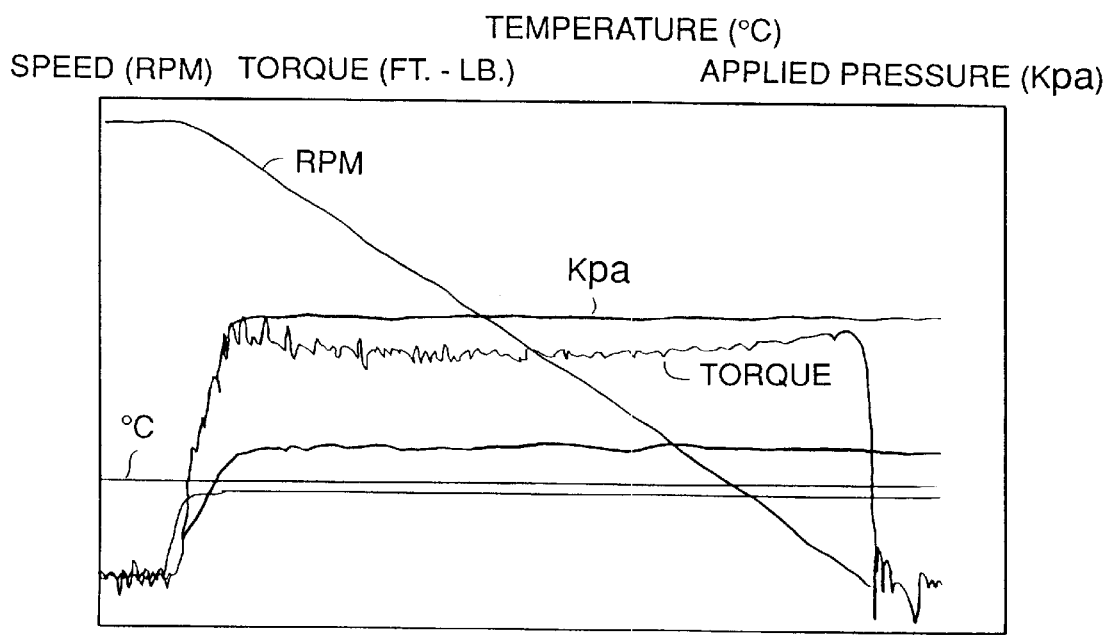
FIG. 37 is a graph showing the curve shape for Example X impregnated with a phenolic resin at 35% to 40% pick-up at level C at 95 cycles.
Figure 38:
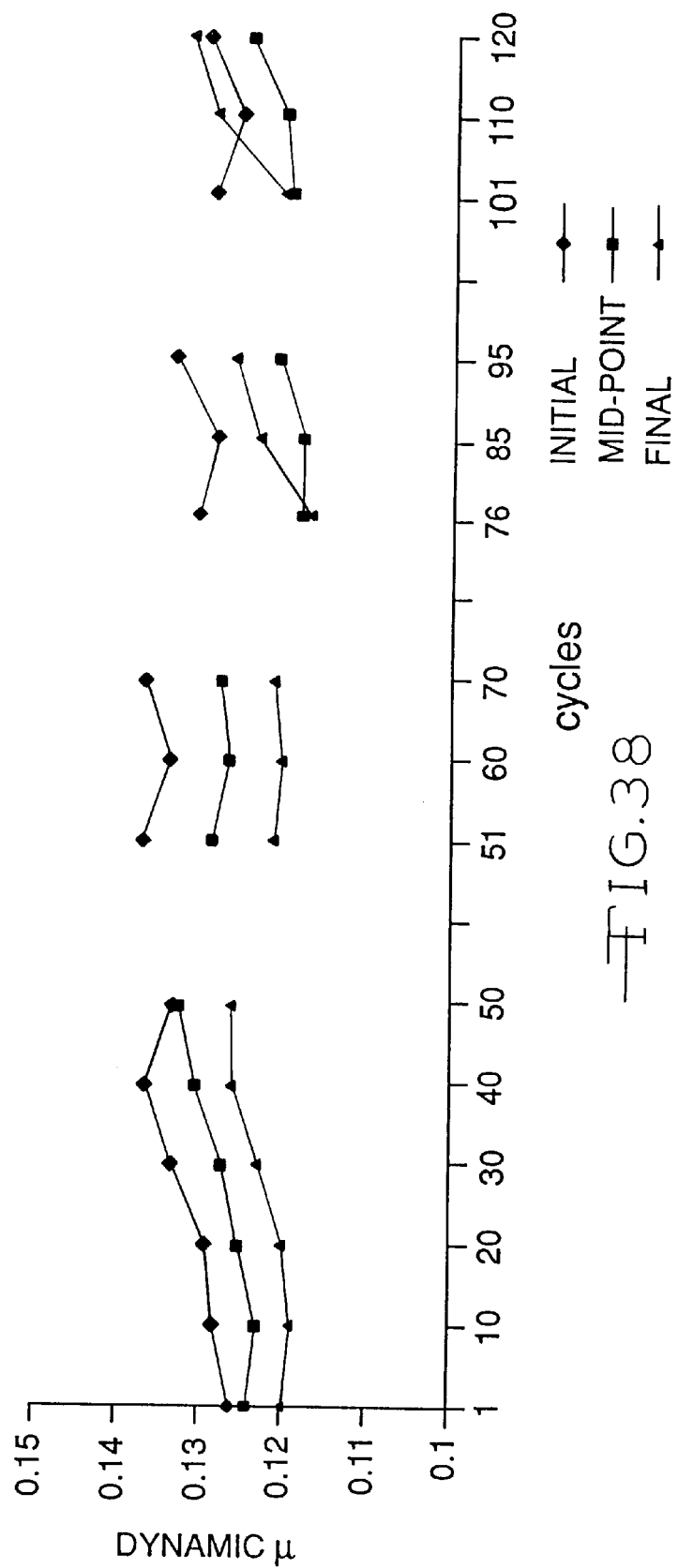
FIG. 38 is a graph showing the dynamic coefficient of friction for levels A, B, C and D for Example X showing the initial, mid point and final coefficients of friction.

FIGS. 36, 37 and 38 show the coefficient of friction curved shapes for Example X which does not contain carbon deposit for levels A, B, C and D showing the initial mid point and final coefficient of frictions.

FIGS. 36–37 show the engagement torque characteristics for friction materials without a carbon deposit (relative rotation speed=1400 RPM in FIG. 36 and relative rotation speed=2400 RPM in FIG. 37). FIG. 38 shows the dynamic coefficients of friction ($\mu$) for the friction materials without a carbon deposit at various rotation speeds.

Figure 39:
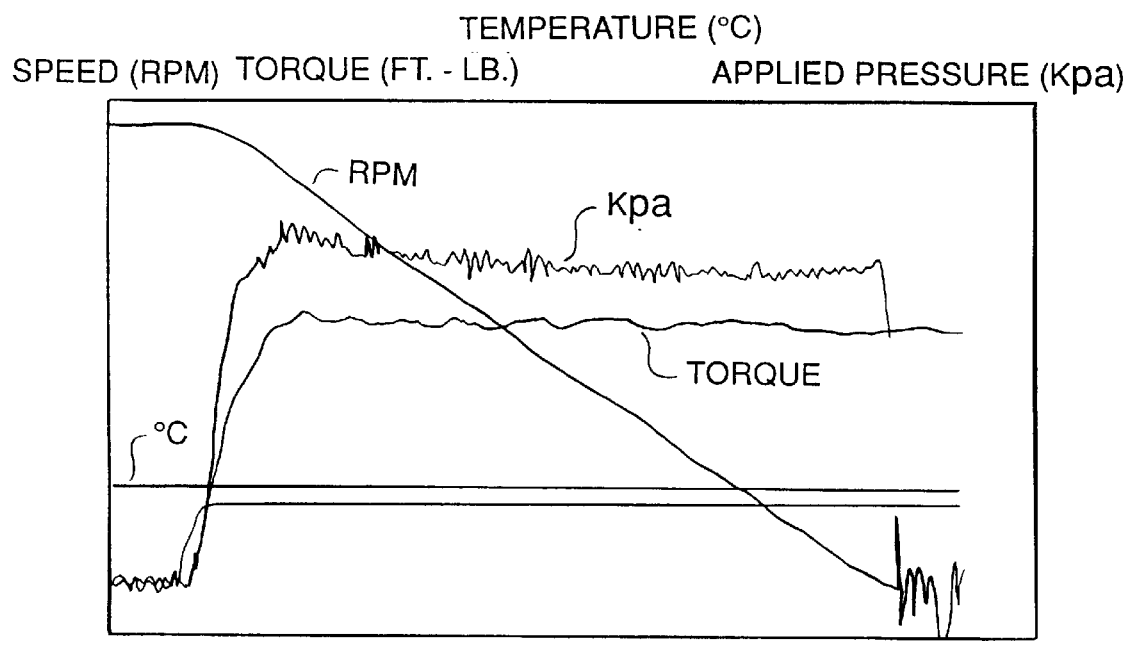
FIG. 39 is a graph showing the curve shape for Example T impregnated with a phenolic resin at 35% to 40% pick-up at level B at 70 cycles.
Figure 40:
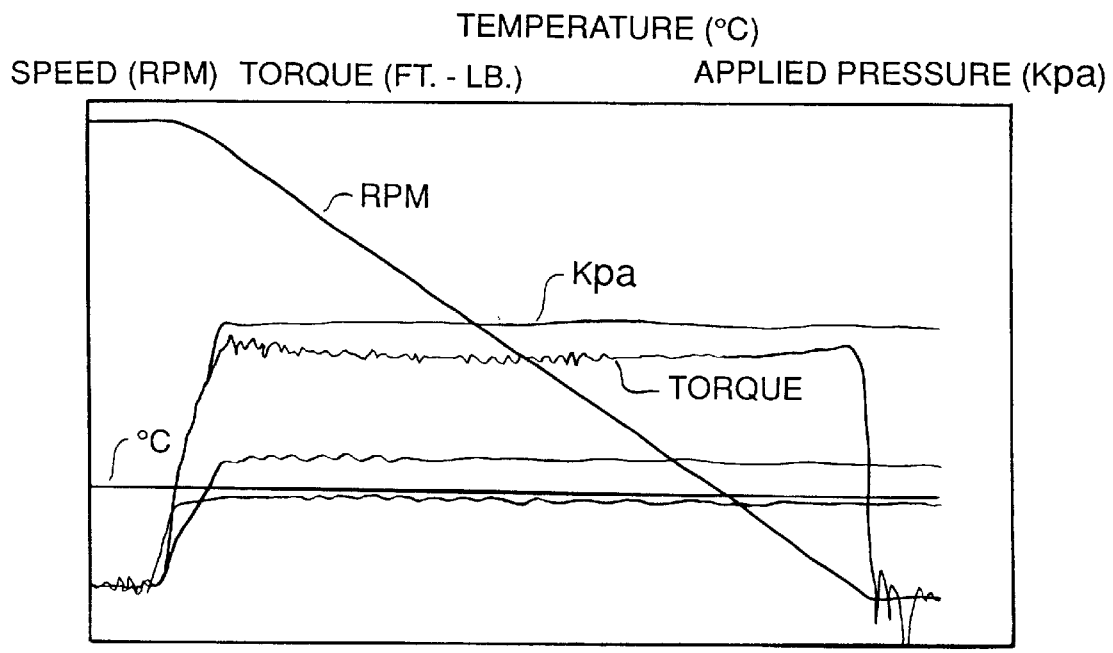
FIG. 40 is a graph showing the curve shape for Example T impregnated with a phenolic resin at 35% to 40% pick-up at level C at 95 cycles.
Figure 41:
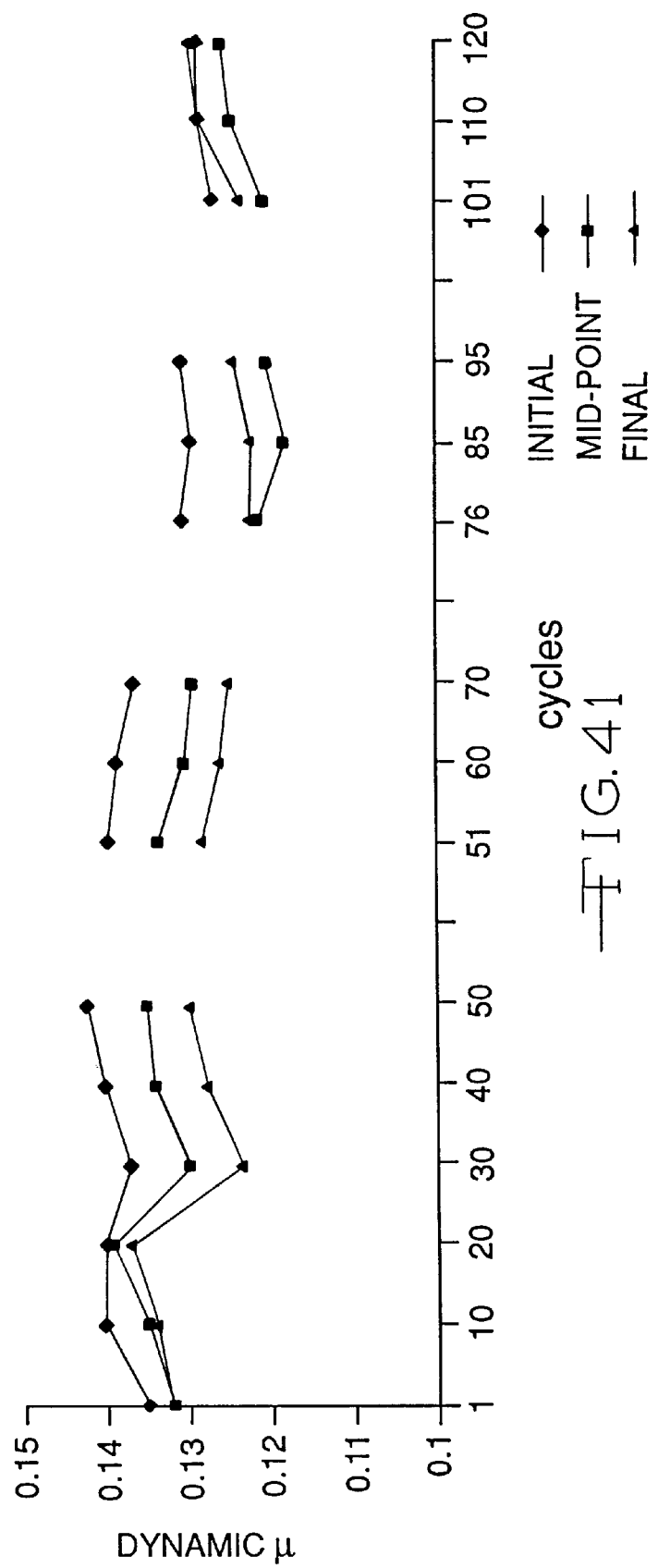
FIG. 41 is a graph showing the dynamic coefficient of friction for levels A, B, C and D for Example T showing the initial, mid point and final coefficients of friction.

FIGS. 39, 40 and 41 show the curve shapes for the Example T comprising a fibrous base material having a less fibrillated aramid fibers (CSF about 580–640) and a secondary layer of about 5%. The Example T is impregnated with a phenolic resin at about 35% to 40% pick-up. FIGS. 39, 40 and 41 show the initial mid point and coefficient of friction for levels A, B, C and D.

FIGS. 39 and 40 show the engagement torque characteristics for friction materials with a 5% carbon deposit (relative rotation speed=1400 RPM in FIG. 39 and relative rotation speed 2400 RPM in FIG. 40). FIG. 41 shows the dynamic coefficients of friction for the friction materials with a 5% carbon deposit at various rotation speeds.

The FIGS. 36–41 show that the Example T has good curve shape rating and good coefficients of friction. The fibrous base material having a secondary layer of carbon deposit has a higher friction durability due to higher thermal conductivity, larger pore size and greater liquid permeability of the primary layer.

TABLE 29

Torque Curve Shape Evaluation

|  | Ex. T 5%-carbon | Ex. X | Ex. Y |
|---|---|---|---|
| Rate B | 4/5 | 1 | 1 |
| C | 4 | 1 | 1 |
| Coeff. A | 0.143 | 0.132 | 0.134 |
| B | 0.137 | 0.127 | 0.132 |
| C | 0.129 | 0.121 | 0.120 |
| D | 0.131 | 0.125 | 0.119 |
| Break-in % | *2.0 | *2.1% | *2.1 |
| Stop-time/$\mu$ | 0.7 | 6.40 | 1.5 |

EXAMPLE 29

Table 30 below provides a summary of test procedure conditions for the high speed durability test 5004CN for a loose carbon friction material, Example BB, and a carbon deposit friction material, Example CC. The Example BB is a friction material comprising a primary layer having a basis weight of 172 lbs. and comprising less fibrillated aramid fibers, synthetic graphite, filler, 2% latex retention aid, and optionally cotton fibers and having a secondary layer of about 5 lbs. carbon particles (approximately 5%, by wt., based on the weight of the fibrous base material) with no retention aid as compared to the Example CC friction material comprising the same primary layer and having a secondary layer comprising about 5 lbs. carbon particles (approximately 5%, by wt., based on the weight of the fibrous base material) and 5% latex material. Assembly or core plates were lined with the above-described friction materials impregnated with a phenolic resin at about 35% resin pickup to form a pack for testing. The loose carbon friction material (Example BB) failed at 1050 cycles, while the carbon deposit on material Example CC passed 3100 cycles. The coefficient of friction for levels A, B and C indicate that the carbon deposit fibrous base materials perform consistently and the stop times are consistently acceptable.

TABLE 30

5004CN Test Procedure
(Medium-high speed durability test)

| Basis weight | 172 | 172 |
|---|---|---|
| Carbon concentrate | 5 lb | 5 lb |
| Top layer retention aid | 0 | 5% |
| primary layer latex | 2% | 2% |
| Resin Pickup % | 35% | 35% |
| Total wear(in) |  | 0.0089 |
| Friction plate condition |  | glazing abrasion |
| Steel plate condition |  | heat stains grayish stains |
| Stop Time (Sec.) |  |  |
| A | 0.893 | 0.866 |
| B | 0.84 | 0.877 |
| C |  | 0.957 |
| Level A (at 50 cycles) |  |  |
| Static $\mu$ | 0.088 | 0.099 |
| Initial $\mu$ | 0.15 | 0.154 |
| Midpoint $\mu$ | 0.134 | 0.133 |
| Final $\mu$ | 0.133 | 0.134 |
| Level B (at 3050 cycles) | fail @ 1050 cycle | pass 3100 cycles |
| Static $\mu$ | 0.095 | 0.076 |
| Initial $\mu$ | 0.109 | 0.106 |
| Midpoint $\mu$ | 0.112 | 0.104 |
| Final $\mu$ | 0.108 | 0.1 |
| Level C (at 3100 cycles) | N/A |  |
| Static $\mu$ |  | 0.1 |
| Initial $\mu$ |  | 0.14 |
| Midpoint $\mu$ |  | 0.122 |
| Final $\mu$ | 0.125 |  |

EXAMPLE 30

Figure 43:
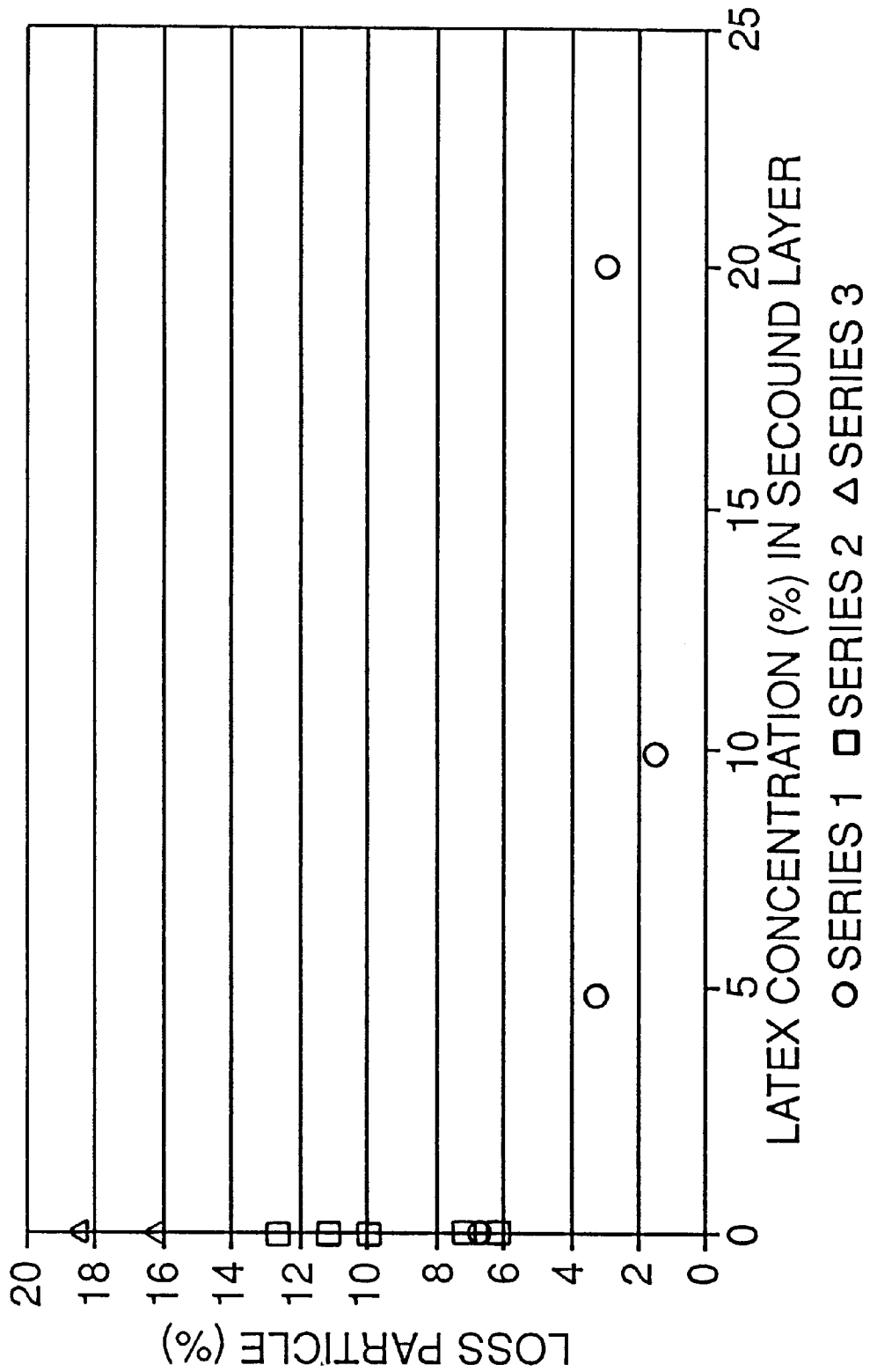
FIG. 43 is a graph showing the percent of carbon particle loss compared to the retention aid concentration in the secondary layer of the fibrous base material, as based on the peel test.

The percent of carbon particle loss was compared to the percent of retention aid present in the secondary layer. FIG. 43 provides the results of a peel test for friction materials with and without a retention aid. It is seen that the carbon deposit friction materials with a latex retention aid only lost between 2 to 3% carbon particles, while the friction materials without the retention aid lost between about 6–18% carbon particles.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

We claim:

1. A process for producing non-asbestos friction material comprising coating at least one surface of a fibrous base material which comprises less fibrillated aramid fibers having a freeness about 300–700 on the Canadian Standard Freeness index, with a mixture of carbon particles and at least one retention aid, wherein the carbon particles cover about 3 to about 90% of the surface of the fibrous base material, impregnating the carbon particle coated fibrous base material with at least one phenolic resin or modified phenolic resin, and thereafter curing the impregnated fibrous base material at a predetermined temperature for a predetermined period of time.

2. The process for producing the friction material of claim 1, wherein the retention aid comprises a latex material.

3. The process for producing the friction material of claim 1, wherein the retention aid comprises a resinous material.

4. The process for producing the friction material of claim 1, wherein the retention aid comprises a sizing agent.

5. The process for producing the friction material of claim 1, wherein the retention aid is present in amounts ranging from about 2 to about 28%, by weight, of the carbon particles.

6. The process for producing the friction material of claim 1, wherein the carbon particles are present in a thickness of about 10 to about 50 microns to provide high heat resistance and substantially uniform coefficient of friction to the friction material.

7. The process for producing the friction material of claim 1, wherein the coating comprises about 0.2% to about 30%, by weight, of carbon particles, based on the weight of the fibrous base material.

8. The process for producing the friction material of claim 7, wherein the coating comprises about 5% to about 15%, by weight, of carbon particles, based on the weight of the fibrous base material.

9. The process for producing the friction material of claim 7, wherein the coating comprises about 3 to about 5%, by weight, of carbon particles, based on the weight of the fibrous base material.

10. The process for producing the friction material of claim 1, wherein the carbon particle size ranges from about 6 to about 50 microns.

11. The process for producing the friction material of claim 1, wherein the less fibrillated aramid fibers have average fiber lengths in the range of about 3 to 6 mm.

12. The process for producing the friction material of claim 1, wherein the fibrous base material defines pores ranging in mean average size from about 2.5 to about 12 microns in diameter.

13. The process for producing the friction member of claim 1, wherein the friction material has readily available air voids of at least about 50%.

14. The process for producing the friction material of claim 1, wherein the friction material comprises approximately 25 to about 60% resin, by weight.

15. The process for producing the friction material of claim 1, wherein the friction material is impregnated with a mixture of a phenolic resin and a silicone resin or a mixture of modified phenolic resin and a silicone resin, the amount of silicone resin in the mixture ranging from approximately 5 to approximately 80%, by weight, based on the weight of the mixture, the friction material exhibiting high heat resistance and substantially uniform coefficient of friction.

16. The process for producing the friction material of claim 15, wherein the phenolic and/or modified phenolic resin is present in a solvent material and the silicone resin is present in a solvent material which is compatible with the solvent material of the phenolic and/or modified phenolic resin.

17. The process for producing the friction material of claim 16, wherein the amount of silicone resin present in the silicone-phenolic/modified phenolic resin mixture ranges from about 20 to about 25%, by weight, based on the weight of the mixture.

18. The process for producing the friction material of claim 16, wherein the amount of silicone resin present in the silicone-phenolic/modified phenolic resin mixture ranges from about 15 to about 25%, by weight, based on the weight of the mixture.

19. The process for producing the friction material of claim 15, wherein the modified phenolic resin comprises an epoxy phenolic resin.

* * * * *